(12) United States Patent
Chambers et al.

(10) Patent No.: US 11,295,624 B2
(45) Date of Patent: Apr. 5, 2022

(54) DECENTRALIZED AIR TRAFFIC MANAGEMENT SYSTEM FOR UNMANNED AERIAL VEHICLES

(71) Applicant: Zipline International Inc., San Francisco, CA (US)

(72) Inventors: Andrew Chambers, San Francisco, CA (US); Ryan Oksenhorn, Pacifica, CA (US); Jeremy Schwartz, Redwood City, CA (US); Keenan Wyrobek, Half Moon Bay, CA (US)

(73) Assignee: Zipline International Inc., San Francisco, CA (US)

( * ) Notice: Subject to any disclaimer, the term of this patent is extended or adjusted under 35 U.S.C. 154(b) by 250 days.

(21) Appl. No.: 16/005,378

(22) Filed: Jun. 11, 2018

(65) Prior Publication Data

US 2019/0088145 A1 Mar. 21, 2019

Related U.S. Application Data

(63) Continuation of application No. 14/966,265, filed on Dec. 11, 2015, now Pat. No. 9,997,080.

(60) Provisional application No. 62/237,730, filed on Oct. 6, 2015.

(51) Int. Cl.

| G01C 23/00 | (2006.01) |
| G05D 1/00 | (2006.01) |
| G05D 3/00 | (2006.01) |
| G06F 7/00 | (2006.01) |
| G06F 17/00 | (2019.01) |
| G08G 5/04 | (2006.01) |
| B64C 39/02 | (2006.01) |
| G08G 5/00 | (2006.01) |

(52) U.S. Cl.
CPC ........... *G08G 5/045* (2013.01); *B64C 39/024* (2013.01); *G08G 5/006* (2013.01); *G08G 5/0008* (2013.01); *G08G 5/0013* (2013.01); *G08G 5/0021* (2013.01); *G08G 5/0034* (2013.01); *G08G 5/0039* (2013.01); *G08G 5/0069* (2013.01); *G08G 5/0078* (2013.01); *G08G 5/0086* (2013.01); *B64C 2201/141* (2013.01)

(58) Field of Classification Search
CPC .... G08G 5/045; G08G 5/0013; G08G 5/0021; G08G 5/0034; G08G 5/006; G08G 5/0069; G08G 5/0078; G08G 5/0086; G08G 5/0008; G08G 5/0039; B64C 39/024; B64C 2201/141
See application file for complete search history.

(56) References Cited

U.S. PATENT DOCUMENTS 8,868,328 B1 * 10/2014 Estkowski ........... G08G 5/0034
  701/301
9,224,302 B1  12/2015 Young
9,300,581 B1 * 3/2016 Hui ..................... H04L 61/2015
(Continued)

*Primary Examiner* — Abby Y Lin
*Assistant Examiner* — Sohana Tanju Khayer
(74) *Attorney, Agent, or Firm* — Dorsey & Whitney LLP

(57) ABSTRACT

An unmanned aircraft system includes an aircraft control system that enables the safe operation of multiple unmanned aerial vehicles in the same airspace, through the use of a decentralized air traffic management system. The decentralized air traffic management system is robust against loss of communication between the unmanned aerial vehicle and does not require a centralized ground control system to coordinate the vehicles.

21 Claims, 9 Drawing Sheets

(56) References Cited

U.S. PATENT DOCUMENTS

| | | | | |
|---|---|---|---|---|
| 9,646,502 | B1* | 5/2017 | Gentry | G08G 5/0013 |
| 9,841,761 | B2 | 12/2017 | Shehata | |
| 2013/0244588 | A1* | 9/2013 | Pereira | H04L 67/12 |
| | | | | 455/73 |
| 2014/0012436 | A1* | 1/2014 | Coulmeau | G05D 1/0607 |
| | | | | 701/3 |
| 2014/0019033 | A1* | 1/2014 | Berge | G08G 5/00 |
| | | | | 701/120 |
| 2015/0045989 | A1* | 2/2015 | Polansky | G01C 23/00 |
| | | | | 701/2 |
| 2015/0237569 | A1* | 8/2015 | Jalali | H04B 7/18506 |
| | | | | 370/326 |
| 2015/0339031 | A1 | 11/2015 | Zeinstra | |
| 2016/0171895 | A1* | 6/2016 | Scharl | G05D 1/0202 |
| | | | | 701/4 |
| 2016/0358481 | A1* | 12/2016 | Vesely | G08G 5/0008 |

* cited by examiner

DECENTRALIZED AIR TRAFFIC MANAGEMENT SYSTEM FOR UNMANNED AERIAL VEHICLES

CROSS-REFERENCE TO RELATED APPLICATION

This application is a continuation application of U.S. Application No. 14/966,265, filed Dec. 11, 2015, titled "Decentralized Air Traffic Management System for Unmanned Aerial Vehicles," now U.S. Pat. No. 9,997,080, issued Jun. 12, 2018, which is a non-provisional patent application of and claims the benefit to U.S. Provisional Patent Application No. 62/237,730, filed Oct. 6, 2015, and titled "Decentralized Air Traffic Management System for Unmanned Aerial Vehicles," the disclosures of which are hereby incorporated herein by reference in their entirety.

TECHNICAL FIELD

This disclosure relates generally to an air traffic management system, and, in particular, describes systems and methods for managing multiple autonomous aerial vehicles in a decentralized manner.

BACKGROUND

Autonomous aerial vehicles have been gaining popularity in the last few years. Unmanned Aerial Vehicles (UAVs) have gone from a rarity to a common sight. UAVs are used not only by hobbyists and recreational flyers, but also by governments and businesses, for purposes such as surveillance, mapping, and most recently, aerial delivery.

SUMMARY

As the number of UAVs in the airspace increases, the danger that UAVs pose to each other also increases. Unlike manned aircraft, there is no standard and/or centralized air traffic control system for managing the routes and flights of UAVs to prevent collisions or other interference. Moreover, many UAVs lack the capability to sense and avoid other aerial vehicles, and thus rely on an assumption that the airspace around them will be free of other aircraft. As the number of UAVs in the airspace increases, this assumption becomes more and more untenable.

For piloted UAVs operating within the line-of-sight of a ground operator, manual intervention can sometimes be relied upon to avoid collisions between multiple UAVs operating in the same vicinity. However, for UAVs operating beyond line-of-sight, and for autonomous UAVs, which are flown completely under computer control, manual intervention may not be possible or sufficient.

Embodiments discussed herein are related to methods and systems for coordinating the safe operation of multiple autonomous or semi-autonomous UAVs in a decentralized manner.

BRIEF DESCRIPTION OF THE DRAWINGS

The figures use like reference numerals to identify like elements. A letter after a reference numeral, such as "100a," indicates that the text refers specifically to the element having that particular reference numeral. A reference numeral in the text without a following letter, such as "100," refers to any or all of the elements in the figures bearing that reference numeral (e.g. "100" in the text refers to reference numerals "100a" and/or "100b" in the figures).

DETAILED DESCRIPTION

While the present disclosure has been described with reference to various embodiments, it will be understood that these embodiments are illustrative and that the scope of the disclosure is not limited to them. Many variations, modifications, additions, and improvements are possible. Modules and procedures may be separated or combined in different ways in various embodiments, or described with different terminology. These and other variations, modifications, additions, and improvements may fall within the scope of the disclosure as defined in the claims that follow.

This document describes a decentralized air traffic management system for managing autonomous aerial vehicles. The air traffic management system includes systems onboard individual UAVs that are designed to operate substantially independently of a ground operator. This disclosure also describes a method for coordinating such onboard UAV systems to ensure safe operation of multiple UAVs without operator intervention.

Unless otherwise noted, the present description of the air traffic management system applies equally to manned aircraft. Nevertheless, details that apply to manned aircraft may be noted where they are helpful or illustrative.

Unmanned Aerial System (UAS)

The UAS disclosed in this document is an example implementation of a decentralized air traffic management system designed to ensure the safe operation of aircraft without the need for a centralized, ground-based air traffic management authority. In this embodiment the aircraft are fixed-wing UAVs, but the air traffic management system and the decentralized air traffic management method may be utilized for any type of aircraft, both manned and autonomous. As used herein, the term "autonomous" may refer to operations of an unmanned vehicle that are performed by the vehicle without user intervention and/or control, as well as to describe vehicles that are designed to operate without human intervention and/or control for all or portions of their missions. Accordingly, a vehicle and/or a system may be described as autonomous even though a human operator may choose to override the vehicle's autonomous control.

The UAS provides a platform for performing various target functions, including, but not limited to, package delivery, data capture, mapping, surveillance, and infrastructure provisioning. While specific embodiments of the UAS system are described herein, some embodiments may comprise systems and methods that are not generally relevant to every target function. One skilled in the art will readily recognize the relevance of a recited system or method in relation to the target functions.

Figure 1A:
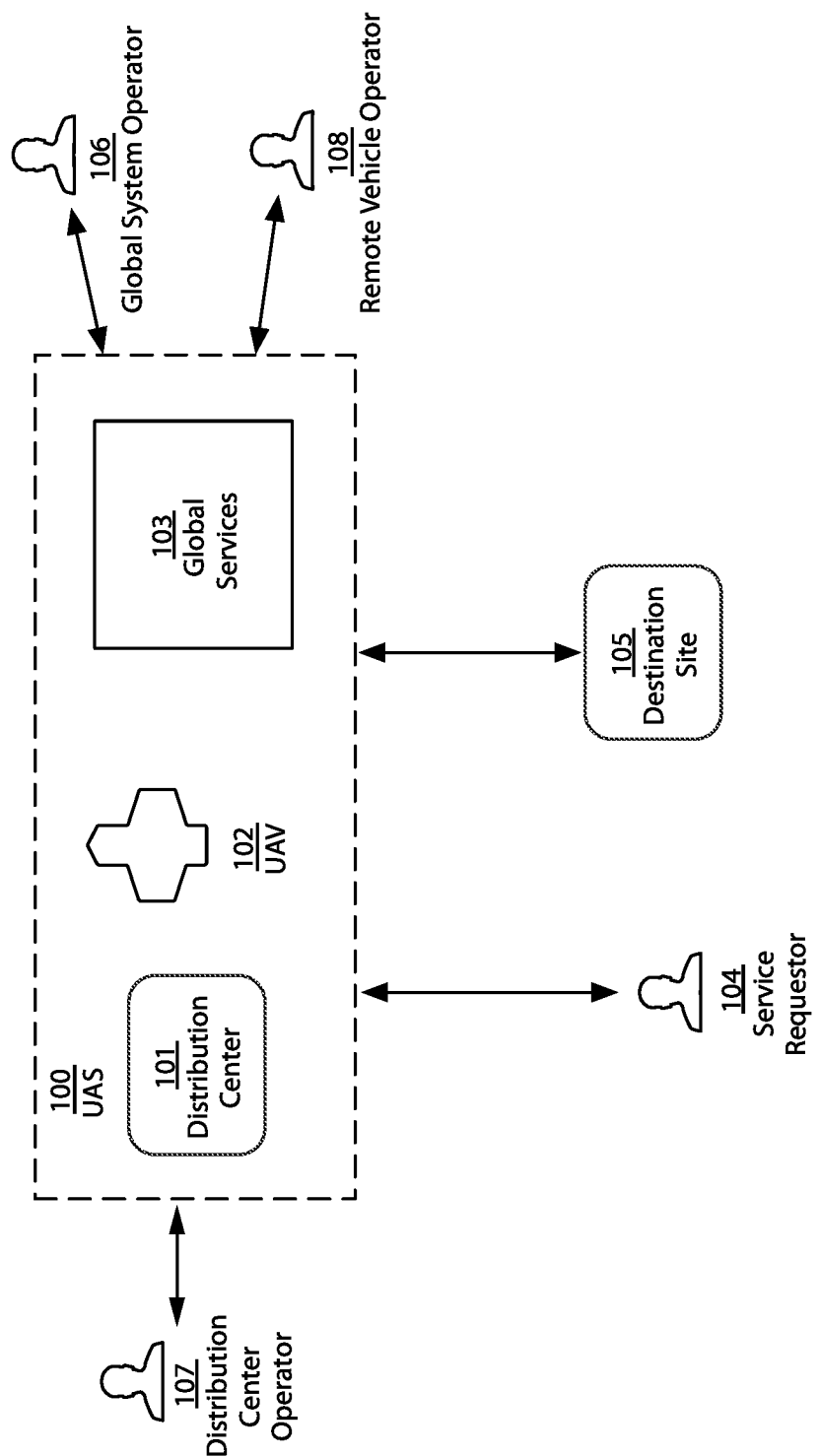
FIG. 1A is a diagram illustrating the components of a Unmanned Aerial System (UAS) and entities that may interface with it, according to one example embodiment.

FIG. 1A illustrates an embodiment of a UAS and interfacing entities. In this embodiment, components of the UAS 100 (e.g. the distribution center 101 or global services 103) receive a service request from a service requestor 104 and deploy a UAV 102 to fulfill that request. In the event that the UAV 102 encounters a situation that its onboard automation cannot understand or handle (or a human operator becomes aware of a situation that warrants human intervention), the UAS 100 is able to provide human intervention by selecting a remote vehicle operator 108 who can issue commands to the UAV 102. In this embodiment, the UAS 100 comprises a distribution center 101, a UAV 102, and global services 103.

The service requestor 104 is a human user or an autonomous system that issues a service request to the UAS 100. In the case where the service requestor 104 is a human user, that user may use a remote client device such as a mobile phone, tablet, or personal computer to issue the request. A service request is an instruction to the UAS 100 to provide some service at the destination site 105. The destination site 105 may be any designated location, such as a portion of open ground, a building, a mailing address, a Global Positioning System (GPS) coordinate, or a slice of airspace. In some embodiments, the destination site 105 is the location of a beacon device. The beacon device may be any device that emits a signal that can be used to track or identify a location, such as for example a transponder, a mobile phone, etc. The destination site 105 may also be designated by identifying a particular object, such as, for example, a designated vehicle, a mailbox, a delivery pad, or some other target object that can be tracked to indicate a target location for a service. In another embodiment, the destination site 105 is the location of the service requestor 104, although this need not be the case. Although one service requestor 104 and one destination site 105 are illustrated in this embodiment, in practice there can be many service requestors 104 and destination sites 105.

The requested service may be any service that can be provided from an airborne platform. For example, in one embodiment, the service request issued by the service requestor 104 is a request to deliver a package containing a specific payload to the destination site 105. In another embodiment, the service request is a request to capture image data using a camera mounted on the UAV 102, at the destination site 105 or along a route to and from the destination site 105. In yet another embodiment, the service request is a request to provide an Internet access point at the destination site 105 using a Wi-Fi gateway mounted on the UAV 102. Many other services can be provided using the UAS 100 at the destination site 105, such as package pickup, surveillance, mapping, data capture using UAV-mounted instruments, etc.

The UAV 102 is an Unmanned Aerial Vehicle. The UAV 102 can be implemented using a variety of systems and airframes. Almost any practical flying platform can be used as the vehicle base for the UAV 102, including gliders, airplanes, balloons, helicopters, etc. In one embodiment, the UAV 102 is implemented using a fixed-wing aircraft with redundant propulsion systems that is optimized for long-range flight. In another embodiment, the UAV 102 is implemented using a quad-rotor aircraft that is optimized for short-range flight and vertical takeoff and landing. In yet another embodiment, the UAV 102 is implemented using a hybrid fixed-wing aircraft, with tilt-rotors, capable of both long-range flight and vertical takeoff and landing. In another embodiment, the UAV 102 is implemented using a fixed-wing aircraft with fixed horizontally oriented motors, configured to provide horizontal thrust, and separate fixed vertically oriented motors configured to provide vertical thrust. The UAV 102 may also be implemented using a lighter than-air-platform such as a balloon, blimp, or other dirigible. One purpose of the UAV 102 in the UAS 100 is to serve as a flexible platform that can be rapidly deployed on demand, with minimum human involvement.

Although the UAV 102 is an autonomous vehicle that is designed to operate without human assistance in most scenarios, it may occasionally require the intervention of a human controller or pilot. For instance, a global systems operator 106 or a distribution center operator 107 may issue a recall command to the UAV 102 while it is on a mission, due to some external issue, such as inclement weather, a canceled delivery, etc. The UAV 102 may also proactively request human assistance while it is on its mission. For example, the UAV 102 may encounter an environment where its vision and/or navigation algorithms cannot produce a path with a high degree of reliability. In such a scenario, the UAV 102 will send a request for assistance to the global services 103. The global services 103 will select a remote vehicle operator 108 to handle the situation, and that operator can send the UAV 102 one or more commands to help it navigate its environment.

The UAV 102 may carry any suitable payloads, depending on the nature of the service request received from the service requestor 104. Components of the UAV 102 are explained in more detail in the description for FIG. 2. Although a single UAV 102 is depicted in FIG. 1, there may be more than one UAV 102 in a UAS 100.

The distribution center 101 is a fixed or mobile facility that facilitates the launch, recharge, communications, repair, and payload logistics for the UAV 102. The distribution center 101 is explained in further detail in the description for FIG. 3. Although a single distribution center 101 is shown in FIG. 1A, there may be more than one distribution center 101 in the UAS 100. In one embodiment, each UAV 102 in the UAS 100 is based at a single distribution center 101, and is repaired, reloaded, and recharged at that distribution center 101. In another embodiment, each UAV 102 can be repaired, reloaded, and recharged at any distribution center 101 in the UAS 100, and UAVs 102 may be routed between distribution centers 101 based on the logistical requirements of current service requests and the projected requirements for future service requests. Each distribution center 101 may have a launcher system that is capable of automated, reliable, high-volume launches of UAVs 102.

The global services 103 may be comprised of one or more computer server systems, running software services (i.e. computer software programs), accessible through the Internet, which provide offsite support, administration, centralized air traffic control, communications, data storage and logistics functions for the distribution centers 101 and the UAVs 102.

It should be noted that the centralized air traffic control that might be provided by the global services 103, can be an enhancement to or a substitute for decentralized air traffic management as described herein.

In one embodiment, the global services 103 route a service request from a service requestor 104 to a distribution center 101 that is geographically adjacent to (or in relative geographic proximity to) the destination site 105.

The global services 103 may also receive requests for assistance from the UAV 102 while it is on its mission. Based on such requests, the global services 103 will select a remote vehicle operator 108 from a pool of operators, and provide data about the UAV 102's environment to the remote vehicle operator 108. Based on this provided data, the remote vehicle operator 108 can provide one or more commands to the UAV 102 to help it surmount any problems that its on-board intelligence cannot handle. The global services 103 are explained in more detail in the description for FIG. 4.

The global system operator 106 may be a human user that monitors and operates the UAS 100 to ensure the correct and efficient functioning of the system. For example, in some embodiments, the global system operator 106 may monitor the UAS 100 through the computer servers of the global services 103, to ensure that a distribution center 101 has the appropriate payload in stock to fulfill a service request from a service requestor 104. In one example embodiment, the global system operator 106 may use the global services 103 to route new stock of a particular payload to a distribution center 101 in anticipation of that payload stock being depleted.

There may be more than one global system operator 106, and the global system operators 106 may monitor and provide services for multiple distribution centers 101, UAVs 102, and service requestors 104.

The distribution center operator 107 is a human user that monitors and operates the distribution center 101. The distribution center operator 107 may ensure that the UAS 100 components that are local to the distribution center 101 function correctly. This includes the UAVs 102 based at the distribution center 101, as well as other components such as launchers, rechargers, payloads, etc. The distribution center 101 provides systems and methods to facilitate the tasks of the distribution center operator 107. For example, in some embodiments, the distribution center operator 107 operating a distribution center 101 is provided with an operator interface that allows her to determine the inventory of each type of payload at that distribution center 101, and that enables her to order more of any type of payload that is in short supply. The distribution center operator 107 may also operate the launcher system located at that distribution center 101. Operating the launching system may include loading UAVs 102 onto the launcher in preparation for launch, as well as monitoring the launcher via the operator interface. The distribution center systems and methods that facilitate the distribution center operator 107's work are explained in more detail in the description for FIG. 3.

The remote vehicle operator 108 is a human user that receives information about the UAV 102 from the global services 103 and may issue commands to the UAV 102 to help it complete its mission. In one embodiment of the system there is a pool of available remote vehicle operators 108 that can provide assistance to any UAV 102 in the system. When the global services 103 receive a request for assistance from a UAV 102, it selects from among the available remote vehicle operators 108 and routes the request to that operator. The remote vehicle operator 108 reviews information about the circumstances of the UAV 102 and sends one or more commands to the UAV 102. Based on these commands, the UAV 102 takes actions that help it to complete its mission. In one embodiment, the roles of the global system operators 106 and the remote vehicle operators 108 are merged.

Figure 1B:
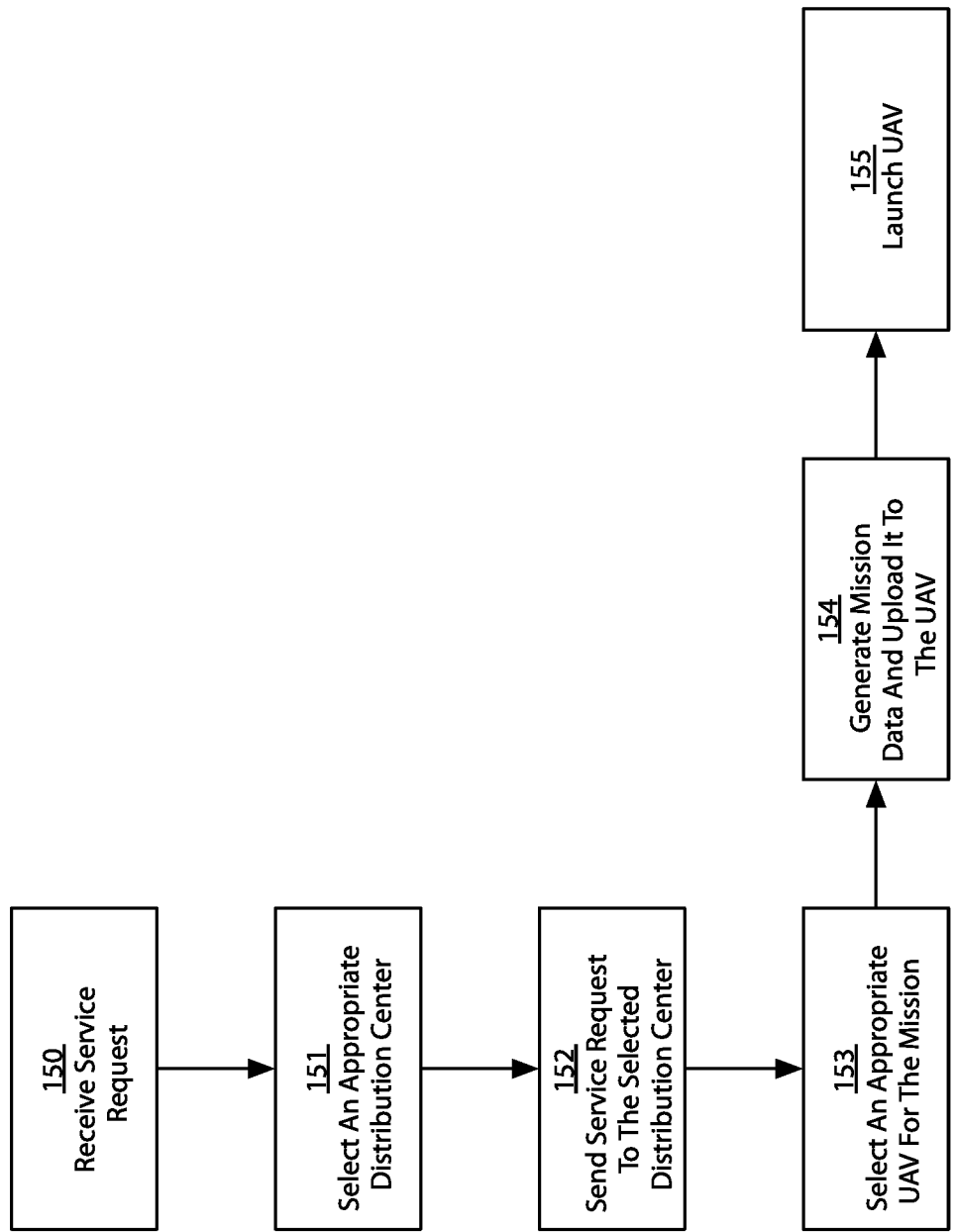
FIG. 1B is a diagram illustrating a UAV launch process, according to one example embodiment.

FIG. 1B illustrates one embodiment of a UAV launch process implemented by the UAS 100. As an initial step the global services 103 of the UAS 100 receive 150 a service request from a service requestor 104. The service request specifies a destination site 105, which designates the location where the service is to be delivered. As described herein, the service request may also include payload information, corresponding to a payload requested by the service requestor. The global services 103 then select 151 a suitable distribution center 101 from which to fulfill the service request. In some embodiments, the global services 103 select 151 the distribution center 101 from which to fulfill the service request by determining the distribution center 101 that is closest to the location of the destination site 105. In another embodiment, the global services 103 select 151 a distribution center 101 to fulfill the service request by taking into account both the proximity of the distribution center 101 to the destination site 105 as well as an inventory at the distribution center 101 that indicates the availability of a payload specified in the service request. For example, if the service request is a request to deliver a specific type of item to the destination site 105, the global services 103 will select the distribution center 101 from those distribution centers that are near the destination site 105 and have the requested item in their inventory. Other factors can also be used to select a distribution center 101, such as, for example, the local weather conditions and air traffic at the distribution centers 101.

Once a distribution center 101 is selected 151, at least a portion of the information in the service request is sent 152 to that distribution center 101. In addition to the destination site location and payload information, the service request may contain other information that is useful at the distribution center 101 for the fulfillment of the service request. For example, in some embodiments, the service request further comprises a time designating when the service request should be fulfilled at the destination site 105.

A UAV 102 can be selected 153 to fly a mission to fulfill the request, either during the distribution center selection process or afterwards. The UAV 102 that will fly the mission may be selected 153 based on one or more criteria that are relevant to the service request and/or system efficiency. For example, in one embodiment, the UAV 102 is selected 153 based on the charge level of its battery and the distance to the destination site 105. In another embodiment, the UAV 102 is selected 153 based on the instruments that are installed on its airframe and a type of data capture specified in the service request. In yet another embodiment, the UAV 102 is selected 153 based on a package in its payload matching a package specified for delivery in the service request.

In an alternative embodiment, the UAS 100 does not select from pre-configured UAVs for a given mission. Instead, either the distribution center 101 or the global services 103 determine a set of components that are used or useful to complete the service request, and the distribution center 101 causes a UAV comprising the required components to be assembled for the mission. For example, if the destination site 105 is a certain distance from the distribution center 101, the UAV for the mission can be configured with a suitable battery pack and engines to complete a round-trip flight to that destination.

The selection 153 of the UAV 102 may occur after the selection 151 of the distribution center, or may be used as a factor in selecting 151 the distribution center 101. For example, the distribution center 101 may be selected 151 from only those distribution centers that have a particular type of UAV airframe, UAV battery, or UAV engine, based on the weight of a payload associated with the service request.

Once the UAV 102 is selected 153 for the mission, mission data is generated 154 for it. The mission data is information that enables the UAV 102 to navigate to the destination site 105 and fulfill the service request. In some embodiments, the mission data includes GPS coordinates for the destination site 105 as well as flight corridor information facilitating navigation to those GPS coordinates. The flight corridor information is discussed in more detail in the descriptions for FIG. 2A and FIG. 3. Further details related to the mission data are discussed in the descriptions for FIG. 2A, FIG. 3, and FIG. 4. After the mission data is generated 154, it is uploaded into a database on the UAV 102.

Once the mission data is generated and uploaded 154, the UAV 102 is launched 155. From the time the UAV 102 is launched and until it lands again, it is considered to be on a mission to complete the service request. In one embodiment, the UAV 102 may be launched with a mission to fulfill more than a single service request. In another embodiment, at least a part of the mission data is uploaded and perhaps even generated, after the UAV 102 is launched 155.

Unmanned Aerial Vehicle (UAV)

In this disclosure, the embodiment of the air traffic management system described is a UAS 100, where the individual aircraft are UAVs 102.

Figure 2A:
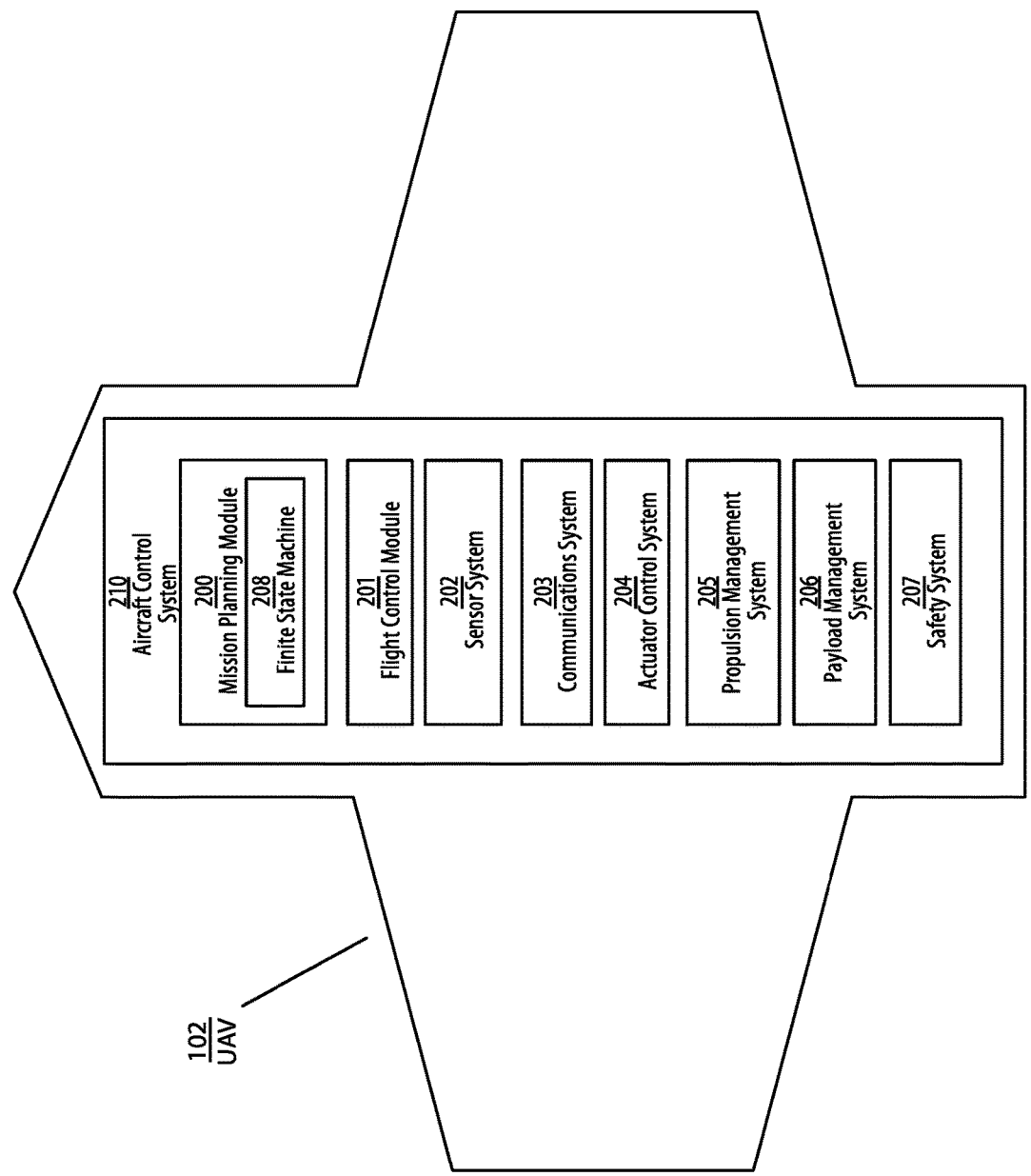
FIG. 2A is a diagram illustrating the components of a UAV, according to one example embodiment.

FIG. 2A is a block diagram of a UAV 102 according to one example embodiment. The UAV 102 is an aircraft system with hardware and/or software modules that enable it to fulfill service requests with little or no human supervision. In one embodiment, the UAV 102 is comprised of an airframe that includes hardware modules that enable it to fly autonomously and complete a service request. The embodiment of the UAV 102 illustrated in FIG. 2A comprises a mission planning module 200, a flight control module 201, a sensor system 202, a communications system 203, an actuator control system 204, a propulsion management system 205, a payload management system 206, and a safety system 207. Collectively, these modules comprise an aircraft control system 210 for the UAV 102. In an embodiment of the UAV 102, two or more of the modules mentioned above may be combined into a single hardware component, for example, to reduce complexity, improve reliability, reduce weight, and/or reduce cost. For instance, in one example embodiment, the mission planning module 200 and the flight control module 201 may be implemented using software modules that run on the same System On Chip (SOC) hardware. Further, any module may be implemented as a circuit component that is distinct from other circuit components. For example, the communications system 203 may be implemented as a first circuit comprising a communications processor, antenna, and the like, while the actuator control system 204 is implemented as a second circuit component comprising a separate processor and other circuit elements. Functionality that is described herein as being performed by a single module may also be split among multiple modules. Moreover, any of the hardware modules described herein (or the functions described as being performed by the hardware modules) may be implemented as software modules, or may include or interact with software modules or other computer programs, computer executable instructions, or the like.

Although not depicted in the figure, the modules of the UAV 102 are interconnected via at least one communications bus. The bus allows the modules to communicate with each other to receive and send information and commands. The bus may be implemented using any of the methods known to those with familiarity in aviation and vehicle engineering. For example, the bus may be implemented using the Controller Area Network (CAN) standard. To improve the reliability of the system, embodiments may use additional redundant buses. For example, a dual-CAN bus can be implemented to prevent a bus failure from causing the UAV to lose control.

The mission planning module 200 is a module that provides the other modules of the UAV 102 with high-level directives and goals; the execution of these directives and goals causes the UAV 102 to fulfill a service request. The goals and directives produced by the mission planning module 200 are communicated to the other modules of the UAV 102, which may then take other actions to complete a mission, including the generation of additional directives and goals for other modules of the system.

For instance, in one embodiment, the mission planning module 200 determines a set of waypoints that the UAV 102 may traverse in order to reach a destination site 105, and provides the location of a first waypoint to the flight control module 201 as a goal, along with a directive to fly to that location. In this embodiment, the flight control module 201 may then, in turn, compute the orientation and propulsion needed to move the UAV 102 towards the goal location; the flight control module 201 may also generate further directives for other modules, such as, for example, for the actuator control system 204 and for the propulsion management system 205. The directives sent to the actuator control system 204 and the propulsion management system 205 may cause them to take actions that change the orientation of the UAV 102 and propel it towards the goal location. As a result of the actions taken by various modules in the UAV 102 in response to the directives and goals of the mission planning module 200, the UAV 102 will fly to the designated first waypoint. Once that goal is achieved, the mission planning module 200 may send new goals and directives to the other modules, such that the UAV 102 flies to a second waypoint, and a third waypoint, and so on, until the higher-level goal of reaching the destination site 105 is fulfilled.

Besides movement directives, the mission planning module 200 may issue other directives to the modules of the UAV 102 that cause actions such as dropping of a payload, capturing of image data, transmitting of data, etc. The mission planning module 200 may also receive commands from the global services 103, from human operators, or from third-party controllers (such as air traffic controllers), and may issue directives to the UAV 102 modules based on these commands. For instance, in one example embodiment, the mission planning module 200, on board a UAV 102, may receive a command from a human operator to fly back to a distribution center 101 due to an approaching storm. In response to this command, the mission planning module 200 will produce new goals and directives that are sent to other modules in the UAV 102, and as a result of these new goals and directives, the UAV 102 will change course and return to the distribution center 101.

In one embodiment, the mission planning module 200 comprises a finite state machine 208. The finite state machine 208 is a data structure that organizes when and under what circumstances the mission planning module 200 issues goals and directives to the other components of the UAV 102, during the course of the UAV 102's mission. Conceptually, the finite state machine 208 comprises a plurality of vehicle states and corresponding valid transitions between those states. At least one of the vehicle states is active at all times during the UAV 102's mission. The mission planning module 200 broadcasts goals and directives, over the communications bus, to the other modules of the UAV 102, based on the current vehicle state. The finite state machine 208 transitions from one vehicle state to another vehicle state as the mission progresses, and when the finite state machine 208 enters a new vehicle state, the mission planning module 200 may broadcast new goals and directives to the other modules of the UAV 102. For example, in one embodiment, the UAV 102 includes the vehicle states: launch, nominal flight, hold position, deliver package, return, and landing. In this embodiment, the mission planning module 200 may begin the mission in the launch state. In the launch state the mission planning module may give the flight control module 201 the goal of making the UAV 102 take off. Based on that goal, the flight control module 201 may increase the thrust provided by the engines and may lower the flaps on the wings by issuing directives to the actuator control system 204 and the propulsion management system 205. Once the vehicle is airborne, the finite state machine 208 may transition to the nominal flight state. In the nominal flight state, the mission planning module 200 may send the flight control module 201 a directive to fly to a particular goal destination. Once the UAV 102 reaches the destination, the finite state machine 208 may transition to the deliver package state. Based on the deliver package state, the mission planning module 200 may send directives to both the flight control module 201 and the payload management system 206, such that the destination site is safely approached, and the payload is released.

The finite state machine 208 may be represented using a variety of different data structures and can be implemented using a variety of hardware, software, or hybrid hardware-software methods. In one embodiment the finite state machine 208 is implemented by creating a technical specification defining the vehicle states and valid state transitions, and then compiling the technical specification to produce an executable or object code that represent the defined states and transitions. In this embodiment, the executable or object code can be stored in a computer storage medium—such as random access memory, hard disc storage, flash memory—in the UAV 102. In another embodiment the technical specification may be translated into a hardware design that can be implemented using one or more hardware modules.

The mission planning module 200 is provided with mission data prior to the launch of the UAV 102 from the distribution center 101. The mission data includes information that enables the mission planning module 200 to locate the destination site 105, to determine an appropriate route to that location, and to perform any request-specific actions to complete the service request. For example, in some embodiments, the mission planning module 200 is provided with a destination location, a route to the destination location, and a series of points along the route where images are to be captured with an on-board camera.

In some embodiments, the mission data includes a local skymap for an area of operations. The area of operations is a geographic region that encompasses the distribution center 101 and one or more destination sites 105 serviced from that distribution center. The local skymap is organized data that includes information that is useful in mission planning, including the locations of destination sites 105, flight corridors, and controlled zones. The local skymap may be stored in a custom data structure, or it may be stored using standard database software such as MYSQL, POSTGRESSQL, MONGODB, COUCHDB, etc. Database software that has the capability to organize and retrieve data based on geographic information is especially suitable for storing the skymap.

A skymap may include one or more flight corridors. A flight corridor is a path in airspace that is designated by the UAS 100 for UAV flight. A flight corridor provides a route between locations. A flight corridor will at a minimum specify lines or curves in space that an aircraft may follow to fly between locations. A flight corridor may also specify bounds (i.e. a volume of airspace) along a path that a UAV may safely maneuver within. A UAV operating in normal circumstances within a flight corridor will respect the bounds of the flight corridor and will not leave those bounds unless there are special circumstances such as, for example, an emergency. The local conditions in a flight corridor may be monitored by the UAS 100, and the flight corridors may be used by the UAVs 102 to travel safely and efficiently between the distribution centers and destination sites.

A flight corridor may be represented in a skymap in a variety of different ways. In one embodiment, a flight corridor is represented as a sequence of geographic coordinates with altitude, stored in a computer storage medium. For example, a flight corridor could be represented as a sequence of latitude, longitude, and altitude (i.e. three-dimensional) points. In this embodiment, the sequence of points defines a series of connected line or curve segments which the flight corridor follows. In this embodiment, the flight corridor bounds may include some additional buffer volume around the segments. The buffer volume that is included in the flight corridor may be some fixed volume around the connected segments. For example, a flight corridor may include the airspace 100 meters above, below, and to the sides of the connected segments, such that the flight corridor is a volume with a rectangular cross-section that follows the path defined by the connected segments.

The volume (bounds) of a flight corridor may also be explicitly defined as part of the flight corridor representation. For example, a flight corridor may be represented as a series of connected rectangular cuboids that form a volume with rectangular cross-section. In another example, a flight corridor may be represented as a path in space (represented as points, lines, or curves) and a radius (or radiuses defined at each point, line segment, or curve segment) that defines a tubular volume in space. The points in space that are used in these representations may specify their location in space via GPS coordinates as well as altitude values.

Metadata can also be associated with the flight corridor representations to store additional information about the flight corridors, such as, for example, local temperature, wind, precipitation, air pressure, etc.

Flight corridors may be subdivided in a way that allows them to safely accommodate several aircraft flying in separate lanes within a single flight corridor. For example, multiple aircraft may be accommodated in a single flight route by assigning each aircraft a distinct and exclusive lane in the corridor. In one embodiment, each flight corridor may be sliced into horizontal layers (like layers in a cake), and each layer in the corridor may be reserved as a lane for a specific UAV 102 for the duration of its mission. For instance, a flight corridor may be sliced into three layers, one lane from 100 m Above Ground Level (AGL) to 110 m AGL, another lane from 110 m AGL to 120 m AGL, and a third lane from 120 m AGL to 130 m AGL. In some cases, lanes may be separated from one another by intermediate layers. For example, intermediate layers of 1 meter (or any other appropriate size) may be defined between each lane.

In another embodiment, the flight corridors may be sliced vertically to create separate, side-by-side lanes within the corridors (similar to the way a terrestrial highway may be divided into separate adjacent lanes). In another embodiment a flight corridor may be sliced both vertically and horizontally to generate separate lanes in both the horizontal and vertical directions. When sliced in this way, a flight corridor will have a grid-like cross section, where each cell in the grid is a separate lane. Intermediate layers may be placed between the lanes to provide a safety buffer between each lane and its neighbors.

A lane within a flight corridor may be assigned to a UAV for the duration of its flight or for part of the duration of its flight. By assigning a lane to a specific aircraft, the system can ensure that even if aircraft cross paths in a flight corridor, their horizontal and/or vertical separation (due to the separation of their assigned lanes) ensures that a collision will not occur. Prior to taking off from a distribution center 101, a UAV 102 may be provided with information from the global services or distribution center that reserves it a lane in one or more flight corridors, which the UAV 102 can safely occupy for the duration of its mission. These reserved lanes in the flight corridors can provide a route for the UAV 102 from the distribution center 101 to the destination site 105.

In one embodiment the assignment of lanes to aircraft is organized by the global services or the distribution centers, and the global services and/or distribution centers will ensure that there are no conflicts in the assignments of lanes. In an alternative embodiment the UAVs may claim lanes for themselves and conflict in lane assignment is avoided by having the UAVs transmit information about their occupation of a lane to other aircraft. For example, aircraft may transmit messages over their radios to inform other aircraft of their occupation of a lane in a flight corridor, and when they leave the lane they may transmit a message to indicate that the lane is now available for another aircraft. Similarly, aircraft will listen for these lane-occupancy messages and will not enter a flight corridor lane if they hear a message from another aircraft that indicates that a lane is occupied.

A controlled zone is a geographical area where aircraft may come into close proximity with other aircraft, and where, therefore, coordination between aircraft is useful to avoid collisions. The location of distribution centers 101 and destination sites 105 are typically controlled zones, since multiple UAVs 102 may approach these locations at the same time. Other locations may also be controlled zones; for example, a place where multiple flight corridors intersect may be a controlled zone. The mission planning module 200 of a UAV 102 may take particular actions when approaching, entering, or leaving a controlled zone, in order to ensure that the UAV 102 maintains a safe distance from other aircraft. As one non-limiting example, the mission planning module 200 may cause the finite state machine 208 to transition to a new vehicle state. Similarly the mission planning module 200 may cause the UAV 102 to change speed, altitude, and/or heading (either as a result of transitioning to a new vehicle state, or without a change of vehicle state).

Controlled zones may be represented in a variety of ways. In one embodiment, a controlled zone is represented by a latitude and longitude coordinate (a center point for the controlled zone) and a radius. In this embodiment the controlled zones may include an implicit or explicit altitude range, and will be cylindrical in shape. In another embodiment, a controlled zone is represented by a polygon defined by a sequence of latitude and longitude points, and may include an implicit or explicit altitude range, defining a three-dimensional polyhedron volume. For example, a controlled zone may be represented by four GPS coordinates that define a rectangular zone, and an implicit altitude range of ground level to 500 meters AGL, defining a three-dimensional polyhedron. Controlled zones, like flight corridors, may also include altitude values to indicate the vertical bounds of the zone. For instance, the latitude and longitude coordinates used to define a controlled zone may also include an altitude coordinate.

The local skymap comprises information about each of a plurality of flight corridors and controlled zones. The information may include, but is not limited to, data about location, altitude, bounds, local wind conditions, local air traffic (e.g., other UAVs and aircraft within the flight corridor), precipitation, aerial hazards, geographic obstacles (e.g. mountains), etc, for flight corridors and controlled zones. Information about conditions in the flight corridors and controlled zones may be collected by the distribution centers 101, the global services 103, the UAVs 102, and/or third party information providers (e.g. emergency, weather, and news services).

In some embodiments, the local skymap is generated from a global skymap, which contains information about a wider geographic area, by selecting the information in the global skymap that pertains to the area of operation. If the global skymap is not excessively large, the entire skymap may be stored on the UAV 102 instead of just the local skymap.

Using the information in the skymap, the mission planning module 200 develops a dynamic route from the distribution center 101 to the destination site 105, prior to launch or soon after launch. The dynamic route takes into account the goals of the mission as well as the requirement of the UAV 102 to return to a distribution center 101 after fulfilling the service request. In some embodiments, the mission planning module 200 receives a pre-generated route from the distribution center 101 or the global services 103, and modifies that route only if it receives a command to do so, or if conditions in the area of operations change over time.

The dynamic route is a sequence of flight corridors that the UAV 102 may traverse to fly from its present location to some goal location. As the UAV 102 flies its mission, it may receive updates to the skymap from the UAS 100, including updates concerning local conditions of the flight corridors in the area of operation. The updates may be received from the global services 103, from the distribution centers 101, or from other UAVs 102. In some embodiments, updates may also be received from the service requestors 104, or from third-parties, such as weather information providers, news services, air traffic controllers, satellites, civil aviation authorities, law enforcement, military aviation authorities, etc.

The mission planning module 200 may modify the dynamic route during the mission as the flight corridor updates are received. For example, in some embodiments, the mission planning module 200 may alter the dynamic route to avoid flight hazards such as inclement weather, aircraft trespassing into a flight corridor, etc. When the dynamic route is modified, the mission planning module 200 will re-determine the sequence of flight corridors that will be traversed to reach the goal location.

Figure 2B:
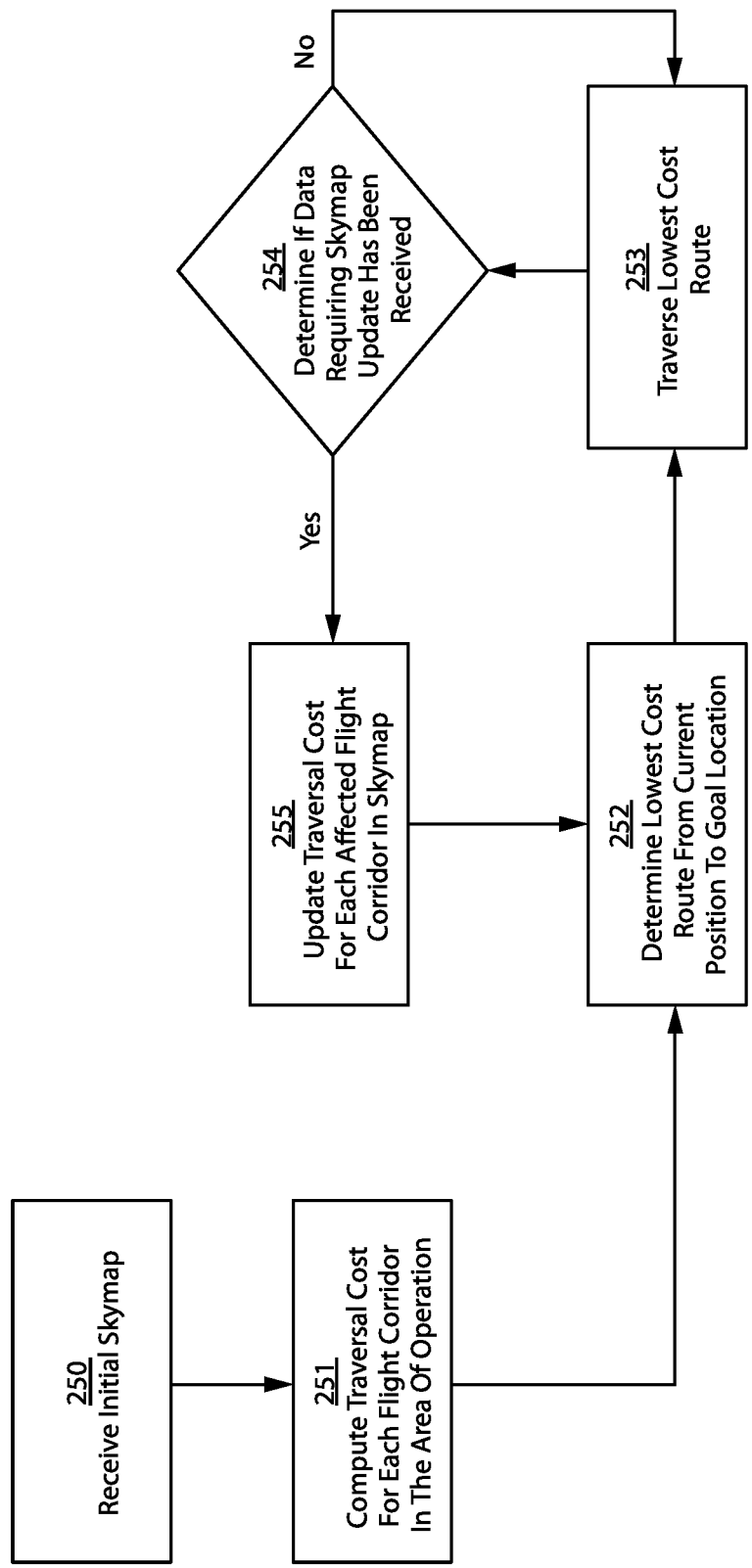
FIG. 2B is a diagram illustrating a process for rerouting a flight, according to one example embodiment.

FIG. 2B illustrates one embodiment of the mission planning module 200's dynamic routing process for a goal location. In the illustrated process the UAV 102 first receives 250 an initial local skymap. The skymap may be received prior to launch or after launch. In one embodiment, a skymap is received from the global services 103 directly. In another embodiment, a skymap is received from the distribution center 101.

In one embodiment, the skymap that is provided to the UAV 102 is a global skymap that contains data about the entire area that the UAS 100 covers. In another embodiment, the skymap contains information about only the area of operation for the UAV 102's current mission.

Once the skymap is received 250 the mission planning module 200 computes 251 a traversal cost for each flight corridor in the area of operation. The traversal cost for a flight corridor is a measure of the suitability of the corridor's path for a flight to the goal location. The goal location may be any point that the UAV 102 may traverse to complete its mission. For example, the destination site 105 may be the goal location on the outward leg of the UAV 102's mission, while the distribution center 101 may be the goal location on the return leg of the UAV 102's mission. The traversal cost of a flight corridor may take into account many factors, including but not limited to, the wind speed and weather in the flight corridor, the air traffic within the flight corridor, the length and elevation of the flight corridor, and the number and direction of maneuvers used to navigate the flight corridor. The traversal cost for a flight corridor may take into account the predicted energy consumption necessary to fly the UAV 102 along the flight corridor's path. Flight corridors that are predicted to require greater energy to traverse may be assigned a greater traversal cost than flight corridors that require less energy. For example, a flight corridor that has a tailwind may have a lower traversal cost than a flight corridor with a headwind. The traversal cost may also take into account regulatory limits to flight paths. For example, if a flight corridor intersects an area that has been temporarily designated as a no-fly zone by the local aviation authority, the traversal cost for that flight corridor may be set to infinity until the no-fly restriction is lifted.

In some embodiments, the traversal cost for flight corridors is pre-computed by the global services 103 or the distribution center 101, and is included in the skymap received 250 by the UAV 102.

After the traversal cost for each flight corridor in the skymap is computed 251 the mission planning module 200 determines 252 a lowest cost route from the UAV 102's current position to the goal location, using the flight corridors. Any appropriate path-finding and/or graph traversal algorithms can be used to find the lowest cost route, including the A* algorithm, Dijkstra's algorithm, and other similar algorithms known to those with skill in the art.

Once the lowest cost route is determined 252, the UAV 102 will traverse 253 the lowest cost route. As the UAV 102 flies to the goal location, it may periodically receive information from the global services 103, the distribution centers 101, other UAVs 102, and third party information sources (such as weather services, aviation authorities, etc.). Any of the data received from such sources may constitute a local skymap update, in the sense that the traversal cost of one or more flight corridors in the area of operations may need to be changed. For example, if the weather in a particular region changes, the traversal cost of flight corridors in that region may increase or decrease depending on the wind in those flight corridors and the direction that the UAV 102 must fly.

The mission planning module 200 may determine 254 whether a given piece of data received by the UAV 102 constitutes a local skymap update by applying rules and heuristics to the received information. For example, in some embodiments, if the mission planning module 200 receives information that pertains to regions outside the area of operations, it may determine that this information does not constitute a local skymap update.

Some information that the UAV 102 receives may be filtered out from consideration because it is not related to factors that may affect the flight of an aircraft. For example, if the UAV 102 receives information regarding inventory levels at a distribution center 101, this information may be stored or forwarded, but it will not influence the local skymap, since inventory levels will not influence the traversal cost of flight corridors. (Note, however, that changing inventory levels may influence the mission planning module 200's selection of a goal destination. For example, after a service request has been fulfilled, a UAV 102 may be routed to land at a distribution center 101 where there are insufficient UAVs in the inventory for future missions, as opposed to the distribution center that it took off from.)

As long as the mission planning module 200 determines 254 that no data requiring an update to the local skymap has been received, the UAV 102 continues to fly on the lowest cost route that has already been determined 252. However, if a local skymap update has been received, then the mission planning module 200 will update 255 the traversal cost for each affected flight corridor in the local skymap.

The mission planning module 200 will then re-determine 252 the lowest cost route to the goal location based on the updated traversal costs of the flight corridors in the local skymap.

As illustrated in FIG. 2A, the UAV 102 also includes a flight control module 201. The flight control module 201 provides the mission planning module 200 with guidance, navigation, and control functions. For example, the mission planning module 200 is required to know the location, orientation, altitude, and speed of the UAV 102 at various times during the mission, and the flight control module 201 provides this information through a process called state estimation. Similarly, when the mission planning module 200 requires the UAV 102 to move from one point to another, it sends commands to the flight control module 201 to achieve that goal. The flight control module 201 communicates over the bus with the sensor system 202, the actuator control system 204, and the propulsion management system 205, to provide the guidance, navigation, and control functions.

The sensor system 202 provides information from sensor instruments to the flight control module 201. In some embodiments, the sensor system 202 comprises several instruments, such as, for example, a GPS unit, an Inertial Measurement Unit (IMU), dynamic pressure sensor, static pressure sensor, air temperature reader, etc.

The actuator control system 204 includes motorized actuators (or actuators that are moved by any other means, such as hydraulics) that control various moving parts on the UAV 102, including the control surfaces on the airframe. The actuator control system 204 can change the state of the motorized actuators based on commands from the flight control module 201. The actuator control system 204 can also report the current state of the motorized actuators back to the flight control module 201.

The propulsion management system 205 controls the force exerted by the engines mounted on the UAV 102—for example by adjusting the speed of propellers mounted on a propeller powered UAV—and monitors the amount of battery capacity remaining on the UAV. The flight control module 201 can adjust the speed of travel of the UAV 102 by communicating with the propulsion management system 205. The propulsion management system 205 may also monitor the physical attributes of batteries onboard the UAV 102, such as changes in a battery's voltage over time, changes in the current output by a battery over time, and even changes in a battery's cell chemistry over the duration of a flight. The monitored information may be communicated to the distribution center 101 or global services 103, either during the mission via the communications system 203, or after the UAV 102 has returned to a distribution center 101. In the latter case the information may be communicated by wireless means, wired means, or by physical transfer of some storage medium such as a memory card.

The flight control module 201 receives information from the sensor management system 202 and the actuator control system 204, and performs a state estimation that provides a best guess of the UAV 102's position, orientation, and speed to the mission planning module 200. The state estimation is continuously updated and checked as the various systems of the UAV 102 provide new information.

The mission planning module 200 determines the high-level goal location that the UAV 102 must travel to and communicates the goal location to the flight control module 201. The mission planning module 200 may communicate directives and goals to the flight control module 201 using any appropriate technique(s). For example, in one embodiment, the mission planning module 200 communicates movement goals to the flight control module 201 via a sequence of waypoints. In another alternative embodiment, the mission planning module 200 communicates movement goals to the flight control module 201 via splines.

The flight control module 201 receives the movement goals—as waypoints, splines, or any other suitable form—and determines, based on rules or physics-based models, the commands that may be communicated to the actuator control system 204 and the propulsion management system 205 to achieve the movement goals. For example, according to some embodiments, the physics-based models output the required rudder and elevator state, and the engine thrust for the UAV 102, based on the current state estimation (i.e. the UAV 102's position, orientation, and speed), and the local conditions including wind and temperature.

The communication system 203 comprises transmitters and receivers that enable the UAV 102 to send and receive information using different communications protocols. The communication system 203 may include transmitters and receivers for standard cellular radio technologies such as CDMA, GSM, 3G/4G, LTE, etc., as well as direct-link radios that allow the UAV 102 to directly communicate with a distribution center 101 or another UAV 102 without retransmission by intervening infrastructure (e.g. a line-of-sight radio).

The communications system 203 may also support mesh networking such that a first UAV 102 can receive and rebroadcast a signal sent by a second UAV 102, in order to increase the effective communications range of the second UAV 102. A third UAV 102 may similarly receive and rebroadcast the signal that was rebroadcast by the first UAV 102, increasing the communications range further still. This method of receiving and rebroadcasting signals for other UAVs may be implemented across the entire area of operations for the UAS 100 to enhance the connectivity of every UAV 102 operating in the system. A custom mesh protocol may be used to implement the mesh networking, or a standard mesh networking protocol such as IEEE 802.15.4, ZIGBEE, BATMAN, HWMP, IEEE 802.11 MESH, etc. In one embodiment of the system, only the direct-link radio is used to implement the mesh networking protocol.

The communications system 203 is used by the mission planning module 200 to periodically broadcast status messages that contain information about the UAV 102's current status. A purpose of the broadcasted status messages is to inform the distribution centers 101, the global services 103, and other UAVs about important information concerning the UAV 102. For example, a status message may contain information about a UAV 102's current position, current heading, current speed, current destination, etc. Other information, such as the UAV 102's payload, status of its batteries, and other similar information may also be broadcast. Some special information related to air traffic management may also be broadcasted in a status message, and this use of status messages is described in more detail below. As noted above, a status message broadcasted by a first UAV 102, may be rebroadcast by other UAVs 102 based on a mesh networking protocol, in order to increase the status message's effective range.

The payload management system 206 performs various functions related to the payload carried by the UAV 102, depending on the nature of the service request and the payload. For example, when the payload is attached to the UAV 102 prior to launch, the payload management system 206, will communicate that the attachment is successful to the mission planning module 200 and/or the distribution center 101. In the case where the service request is a package delivery, the payload management system 206 also monitors the state of the payload—for example the temperature of the payload in the case where the payload is perishable—and manages the release of the payload at the destination site 105. In this example, the mission planning module 200 determines the location, altitude, speed, and orientation of the UAV 102 required to drop the payload safely at the destination site 105, and communicates a command to release the payload at the appropriate time to the payload management system 206. The payload management system 206 receives the command and releases the payload.

The payload management system 206 may perform other functions depending on the nature of the payload. For example, in the case where the service request is related to surveillance or mapping, the payload management system 206 may interface with a camera system included in the payload and can capture images or video based on instructions received from the mission planning module 200. For instance, in this embodiment, the mission planning module 200 may issue a command to the payload management system 206 to capture images when the UAV 102 flies over some point of interest in its route.

The safety system 207 manages various failsafe components mounted on the UAV 102. For example, in one embodiment, the safety system 207 monitors and controls a parachute system that may be deployed based on a command received from the mission planning module 200, or based on information received directly from the flight control module 201 or sensor system 202. For instance, if the UAV 102 enters a non-recoverable dive, the safety system 207 may deploy the parachute based on data received from the sensor system 202. In another embodiment, the mission planning module 200 may instruct the safety system 207 to deploy a parachute based on a message received from the global services 103 or a distribution center 101. Parachute deployment on command may be useful in situations where an air traffic control management detects the possibility of imminent collision between multiple aircraft in an area with heavy air traffic. Forcing a UAV 102 to deploy its parachute and descend may prevent it from entering the flight path of other aircraft.

The mission planning module 200 is designed to follow an air traffic management protocol to minimize the risk of collisions between UAVs 102 operating in the same area. The air traffic management protocol defines actions that must be performed and messages that must be broadcast by UAVs 102 at certain times in a mission and/or under certain conditions.

Figure 2C:
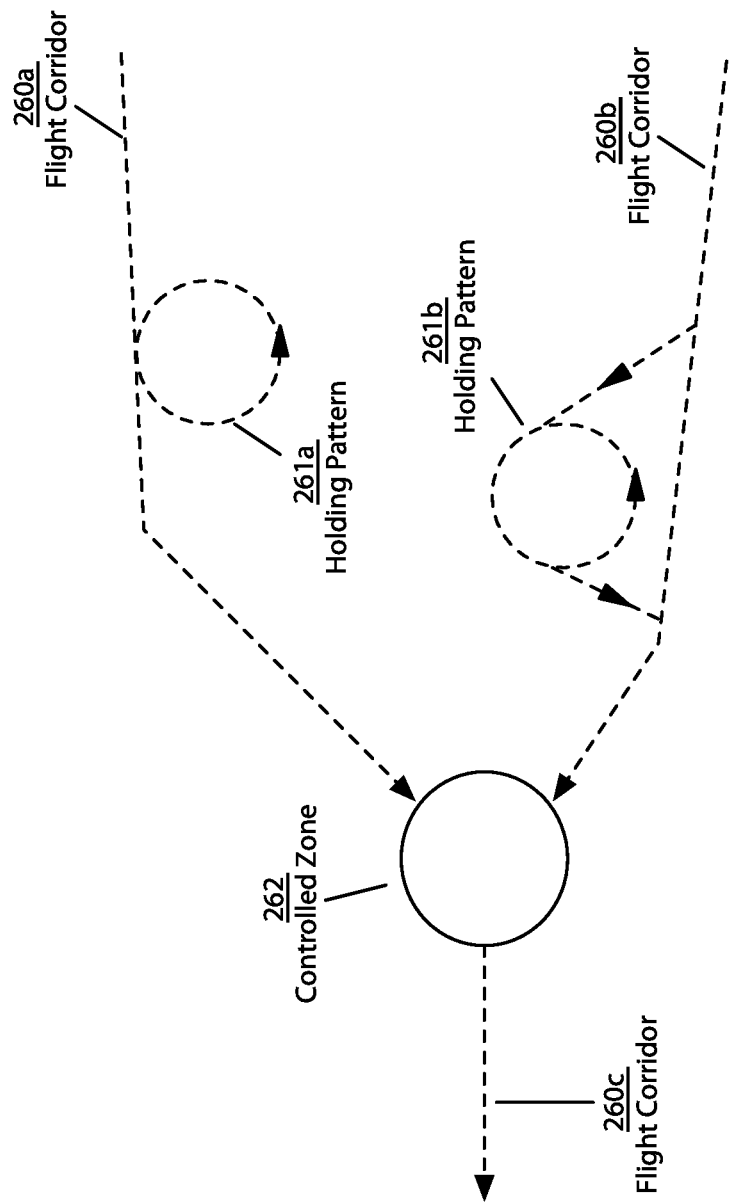
FIG. 2C is a diagram illustrating a representation of a portion of a skymap, according to one example embodiment.

FIG. 2C illustrates a visualized representation of a portion of the data in a skymap according to one example embodiment. In this embodiment the illustrated portion of the skymap includes flight corridors 260, a controlled zone 262, and holding patterns 261. As described previously, the flight corridors 260 are routes that may be safely flown by a UAV 102. As noted above, the flight corridors 260 may specify not only the GPS coordinates for a route, but also an altitude, and each flight corridor 260 may be subdivided into separate lanes to enable multiple aircraft to travel along the same flight corridor 260 without colliding.

The controlled zone 262 is a location in the area of operations where multiple aircraft may conceivably be required to enter at the same time, and where, therefore, there is an increased need for coordination to avoid collisions. For example, a controlled zone 262 may be the airspace around a destination site 105, where more than one aircraft may approach for a delivery. Similarly, a controlled zone 262 may be the airspace around a distribution center 101, where multiple aircraft may be launching and landing at around the same time. While multiple aircraft may traverse a flight corridor 260 at around the same time, these corridors define paths for travel, such that aircraft in a corridor that are travelling in the same lane will travel in the same direction and can adjust their speed as necessary to maintain a minimum safe distance between each other. The controlled zones 262, in contrast, are typically areas where paths of travel are too close to each other, unpredictable, ill-defined, or defined dynamically, such that simultaneously routing multiple aircraft within a controlled zone 262 with ad hoc spacing between them would be dangerous to the aircraft involved.

The holding patterns 261 are special purpose flight corridors that provide a safe looping path that aircraft can enter when they are required to loiter for a period of time. Loitering may be required by the air traffic management protocol in certain circumstances. For example, a controlled zone 262 may allow only one aircraft to enter it at a given time, so aircraft that approach the zone when another aircraft is already in the zone may need to wait for a period of time before entering the zone. Since fixed-wing UAVs cannot hover, such aircraft need a path that they can fly in order to stay aloft. Such a path where aircraft can wait, without being taken far off course, is called a holding pattern or loiter pattern. A holding pattern 261 is typically a closed loop path that is tangential to a flight corridor 260, such that aircraft arriving via the flight corridor 260 can enter the holding pattern 261 directly from the flight corridor 260, and aircraft flying on the holding pattern 261 can exit the holding pattern 261 to re-enter the flight corridor 260. In the illustrated embodiment the holding pattern 261*a* is circular path that is tangential to a flight corridor 260*a*. On the other hand, holding pattern 261*b* is separated from the flight corridor 260*b* and is connected to it via distinct entry and exit routes. A third example of a holding pattern is not illustrated in 2C, but may also play a critical part in the system. In the third example the holding patterns follow the outer radius of controlled zones 262. Aircraft that are restricted from entering a controlled zone may enter into the holding pattern at its borders, until they can safely enter. All forms of holding patterns perform the same function in the system, which is to enable aircraft to safely loiter.

The air traffic management protocol provides rules that the aircraft will follow as it traverses the skymap. The rules define specific messages that must be broadcast based on an aircraft's location and circumstances, as well as based on the location and circumstances of other aircraft. The rules also similarly specify actions that must be performed by an aircraft, based on its circumstances, the circumstances of other aircraft in the area, and based on the messages it receives from other aircraft. The rules specified by the air traffic management protocol are put into practice by the software/hardware systems and methods in the UAV 102, including the systems described above, such as the flight control module 201, the sensor system 202, and the communications system 203. The mission planning module 200 is the hub where information about the UAV's circumstances is aggregated, including communications received, location in the skymap, flight information, etc. The mission planning module 200 issues commands to the other modules and systems of the UAV 102 based in some cases on the aggregated information and the air traffic management protocol. Some examples of the rules that may be defined by the air traffic management protocol and the procedures followed by the mission planning module 200 to implement the rules are described below.

Figure 2D:
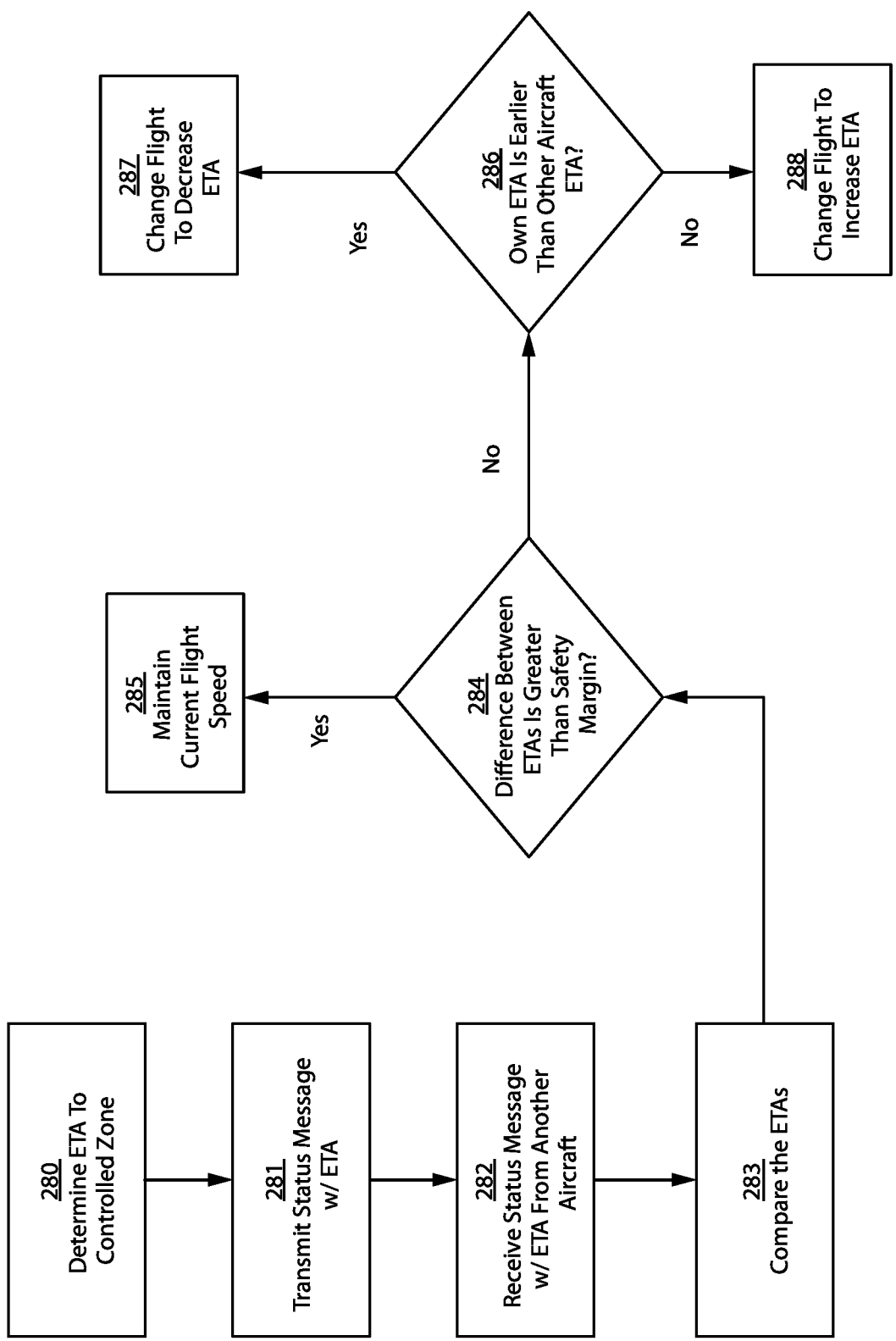
FIG. 2D is a diagram illustrating a process for modifying an aircraft's flight to maintain safety margins, according to one example embodiment.

FIG. 2D illustrates one embodiment of an air traffic management protocol used by a UAV 102 to reduce or eliminate the possibility of multiple aircraft arriving at a controlled zone at the same time. Reducing or eliminating the simultaneous presence of multiple aircraft in an area reduces the possibility of collisions between aircraft.

In some embodiments, the mission planning module 200 of a UAV 102 determines 280 an estimated time of arrival (ETA) to a controlled zone (e.g., the controlled zone 262, FIG. 2C). The ETA can be determined by the mission planning module 200 based on information that it receives from the flight control module 201, the sensor system 202, and/or from information in the skymap. For example, the mission planning module 200 can determine an ETA to a controlled zone based on an estimated time of travel from the UAV 102's current position to the position of the controlled zone. The time of travel can be estimated based on the current speed of travel of the UAV 102 (as reported by the sensor system 202 and/or flight control module 201) and the current distance along a flight route (following flight corridors in the skymap) between the current position of the UAV 102 and the controlled zone. The time of travel can be further refined based on weather information received from the distribution center 101 or global services 103. The weather information may provide data on wind speed and heading that can be used to adjust the time of travel to the controlled zone. For example, a tail wind might reduce the estimated time of travel, while a head wind might increase the estimated time of travel. The estimated time of travel may be adjusted by comparing the heading of the UAV 102 at various points along a flight corridor with the direction and force of the wind at those points. The current time plus the estimated time of travel gives an ETA to the controlled zone.

Once the ETA has been determined 280, the mission planning module 200 then instructs the communications system 203 to broadcast 281 a status message that includes the determined ETA. The status message may be broadcast 281 using a direct-link radio or using some other communications system such as a cellular radio, WIFI, a laser communications system, a microwave communications system, etc. The broadcast 281 may be sent in a way that allows it to be received by any aircraft operating within the area of operations, or the broadcast 281 may be sent in a way such that it is received by only a select set of aircraft in the area of operations (e.g., those that are within a threshold distance of the UAV, or are within a threshold distance of a certain region within the area of operations). The mesh networking capabilities of the communications system 203 may be used to effectively increase the broadcast range of the UAV 102, so that aircraft that are outside the immediate broadcast range of the UAV 102 can still receive its broadcasted status messages.

The mission planning module 200 also receives status messages that have been broadcast by other UAVs 102 that are participating in the air traffic management system. These other aircraft participating in the system may be called "remote aircraft" or "remote UAVs" when considering them from the point of view of a single UAV. As described herein, status messages are periodically broadcast by each UAV 102 and are received periodically by each UAV 102. The mission planning module receives 282 a status message from another aircraft, where the status message contains an ETA to the controlled zone. The mission planning module 200 is now aware that another aircraft is headed to the same controlled zone as the UAV 102.

The mission planning module 200 compares 283 the ETA to the controlled zone for its own aircraft to the ETA for the other aircraft that was in the received status message. The ETAs specify times of arrival at the controlled zone. In one embodiment, comparing the ETAs yields a time difference between the arrivals at the controlled zone for the aircraft.

If the difference between the ETAs is greater than some safety margin time period 284, then the mission planning module will maintain 285 the existing flight parameters for the UAV 102 (including, for example, the existing speed, heading, altitude, or path). No further adjustment will be needed, since there is in this case an adequate margin of safety, such that the aircraft should not enter the controlled zone at the same time.

Safety margins can be set on a zone by zone basis. Controlled zones that are transient places of travel (such as the intersection points between corridors) may set a small safety margin time period, since aircraft will only be in the controlled zone for a short amount of time. On the other hand, controlled zones that require an aircraft to remain within it for an extended period of time (such as perhaps a destination site 105 where a delivery must occur) may require a larger safety margin time period.

If the difference between the ETAs is smaller than the mandated safety margin time period 284, then the mission planning module 200 will take further action (based on determination 286) based on whether the ETA of the UAV 102 is earlier or later than the ETA of the other aircraft. If the ETA of the UAV 102 is earlier, then the mission planning module 200 will issue commands to the flight control module 201 to change 287 the flight of the UAV 102 to decrease the ETA to the controlled zone. Decreasing the ETA (e.g., causing the UAV 102 to arrive earlier than the previous ETA) can be accomplished by increasing the speed of the aircraft. The flight control module 201 may issue commands to the propulsion management system 205 to increase the thrust of the engines (e.g. by increasing the speed of propellers), such that the flight speed of the UAV 102 increases. Increasing speed will hasten the arrival of the faster aircraft and thus increase the difference between the ETAs of the aircraft and increase the margin of safety between their arrival times.

If the ETA of the UAV 102 is later than the ETA of the other aircraft, the mission planning module 200 will issue commands to the flight control module 201 to change 288 the flight of the UAV 102 to increase the ETA to the controlled zone. Increasing the ETA (e.g., causing the UAV 102 to arrive later than the previous ETA) can be accomplished by decreasing the effective speed of the aircraft or by entering a holding pattern. An aircraft's effective speed may be decreased by commanding the propulsion management system 205 to decrease the thrust of the engines (e.g. by decreasing the speed of propellers), or by other methods. Other methods include, for example, causing the UAV 102 to gain altitude (as gaining altitude may slow the aircraft and increases the distance flown) and flying an inefficient path along a flight corridor. An inefficient path is a path other than a straight line along a flight corridor. For example, a UAV 102 flying an s-pattern along a flight corridor will fly a greater distance than an aircraft flying a straight line along a flight corridor. The aircraft flying the s-pattern will thus have a slower effective speed along the corridor. These techniques increase the difference between the ETAs of the aircraft by delaying the slower aircraft, thus increasing the margin of safety between their arrival times.

In one embodiment, the air traffic management protocol can ensure safe spacing between the arrival times to a controlled zone for multiple aircraft by utilizing a weighting function to determine a speed modifier for each aircraft. In this embodiment, the mission planning module 200 determines a speed modifier based on a weighting function that takes as input the differences between the ETAs of the UAV 102 and the ETAs of the other aircraft headed for the same controlled zone.

In this embodiment, if several aircraft are expected to arrive before the UAV 102, but only one aircraft is arriving after it, then the mission planning module 200 may instruct the UAV 102 to slow down its approach to the controlled zone. Although this may seem dangerous because another aircraft is arriving after the UAV 102, if all the aircraft are running the same air traffic management protocol (e.g., the same weighting function), their individual speeding and slowing should create enough of a margin between their arrivals to prevent collisions. For example, the aircraft arriving after the UAV 102 will also delay its ETA to maintain a safe spacing with the UAV 102. Any appropriate weighting function(s) may be used to determine the speed modifications for each aircraft approaching the controlled zone.

In one example embodiment, the weighting function will determine the speed modification by generating a sum (e.g., a weighted sum) of the products of a constant times the inverse of the difference in ETAs between the other aircraft and the UAV 102. For example, if the UAV 102 has a certain ETA to a controlled zone, and four other aircraft are arriving one minute before, two minutes before, three minutes before, and one minute afterwards, respectively, the differences between ETAs (as calculated by the UAV 102) would be −1:00, −2:00, −3:00, and 1:00. The sum of the inverses of these differences would give a total of about −0.8. This value, multiplied by a tuning constant of −0.5, would give an ETA delta of 0.4. This means that the mission planning module 200 needs to delay the arrival of the UAV 102 to the controlled zone by 0.4 minutes. The mission planning module 200 then determines a speed modifier necessary to create this ETA delay (e.g., the aircraft will need to be slowed).

Other weighting functions can also be used. Some functions may use the inverse cube or inverse squares of the differences in ETA. Others may use distance between the aircraft and the controlled zone as the input to the function instead of the ETAs. Moreover, the tuning constant may be any appropriate value to achieve a desired separation of the UAVs.

Prior to entering a controlled zone, a UAV 102 will execute a protocol to ensure that it is not entering a zone that is occupied by another aircraft. The protocol may be executed at any time, but in some embodiments it is executed when the UAV 102 is far enough away from the controlled zone to complete the protocol before it arrives at the controlled zone. If the aircraft cannot complete the protocol before entering the controlled zone, the UAV 102 may slow its arrival to increase its ETA, or may enter a holding pattern until the protocol can be executed.

Figure 2E:
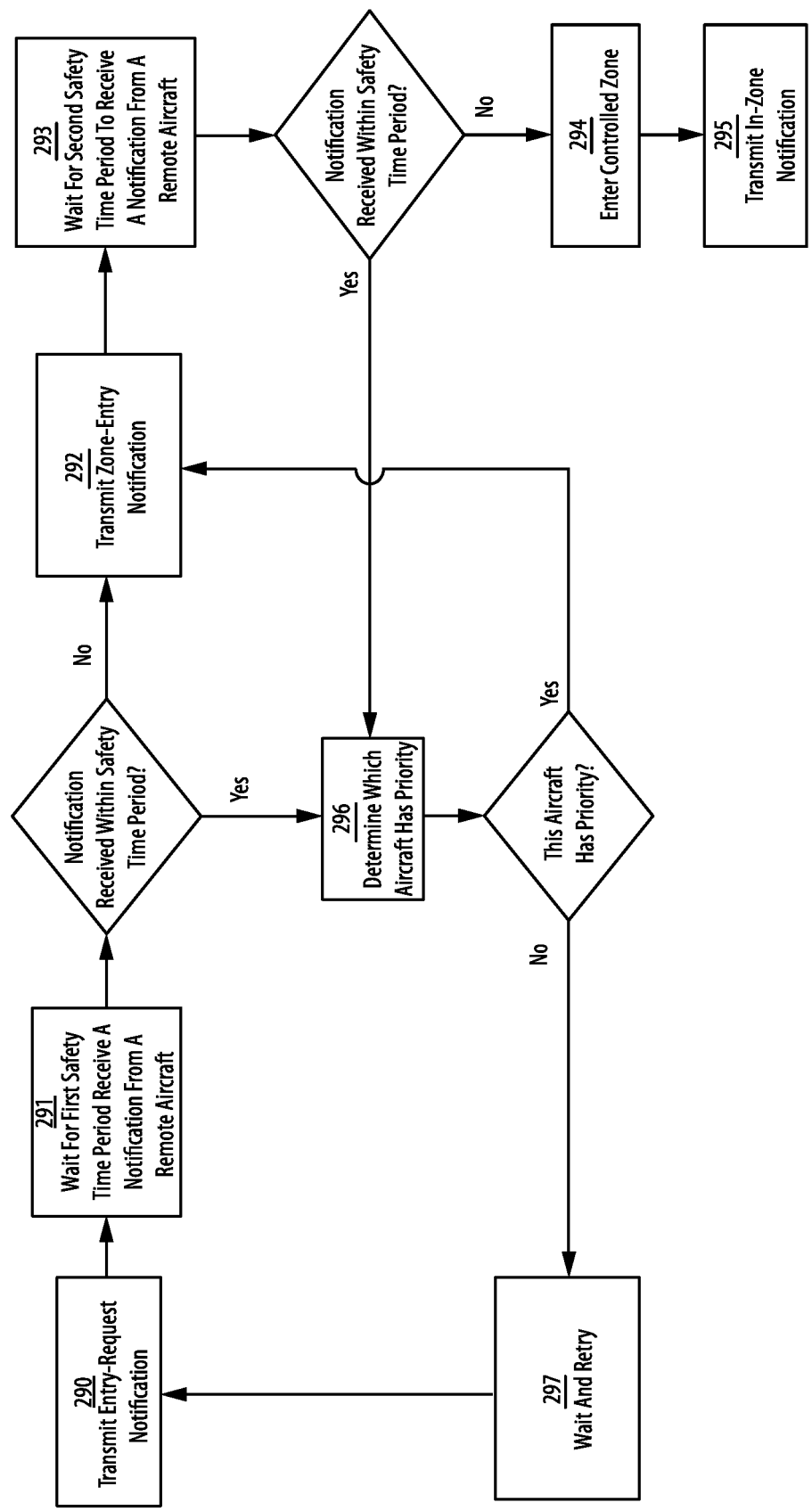
FIG. 2E is a diagram illustrating a protocol for negotiating a safe entry into a controlled zone, in a decentralized manner, according to one example embodiment.

FIG. 2E illustrates one example embodiment of a protocol that may be executed by a UAV 102 prior to entering a controlled zone. In this embodiment, the mission planning module 200 of the UAV 102 commands the communications system 203 to transmit 290 (e.g., broadcast) an entry-request notification. The entry-request notification is a broadcasted message that informs other aircraft that the UAV 102 plans to enter the controlled zone.

After the transmission 290, the mission planning module 200 will wait 291 for some safety time period in which it will monitor for notifications from other aircraft. All aircraft are mandated by the air traffic management protocol to transmit an entry-request notification prior to entering the controlled zone. Aircraft must also transmit a notification if they are already in the controlled zone or about to enter the controlled zone. The mission planning module 200 determines if any such notifications are received during the safety time period to ensure there is no conflict prior to entry. In one embodiment the safety time period that the mission planning module 200 waits for is fixed and is standardized across the system (the precise duration can be part of an air traffic management system standard that is distributed to all UAVs, distribution centers, and global services). In another embodiment the safety time period is set on a zone by zone basis. Controlled zones that are transient places of travel (such as the intersection points between corridors) may set a small safety time period, since aircraft will only be in the controlled zone for a short amount of time. On the other hand, controlled zones that require an aircraft to remain within it for an extended period of time (such as a destination site 105 where a delivery must occur) may have a larger safety time period. In one embodiment, the duration of the safety time period for each controlled zone is set and stored by a distribution center. In another embodiment, the safety time period for each controlled zone is set by the global services. In one embodiment, the safety time period for each controlled zone is set ahead of time (by any of the entities mentioned earlier or by a human operator) and is stored in computer memory aboard the UAVs.

If no notification is received within the safety time period, the mission planning module 200 will instruct the communications system 203 to transmit 292 a zone-entry notification that can be received by other aircraft. The zone-entry notification acts as a warning to other aircraft that the UAV 102 is in the process of entering the controlled zone.

In one embodiment, after transmitting 292 the zone-entry notification, the mission planning module 200 will wait for a second safety time period 293 for a notification from a remote aircraft. By waiting a second time, after transmitting the zone-entry notification, the mission planning module 200 ensures that it has not missed a transmission from a recently arrived remote aircraft, or transmissions from a remote aircraft that has failed to receive the zone-entry notification. This second safety time period is a safety measure and may be eliminated to make the zone entry procedure more efficient.

If no notification is received within the second safety time period (or if the aircraft does not wait for a second safety time period) then the mission planning module 200 will issue commands to cause the UAV 102 to enter 294 the controlled zone. Once the UAV 102 is within the controlled zone, the mission planning module 200 will instruct the communications system 203 to transmit 295 an in-zone notification, which informs all other aircraft that the UAV 102 is now within the controlled zone, and that therefore entry is restricted for all other aircraft.

If a notification is received from a remote aircraft within the first safety time period or the second safety time period, it means that at least one other aircraft is trying to enter the controlled zone at the same time as the UAV. The mission planning module 200 will determine 296 which aircraft, among all the aircraft that wish to enter the controlled zone, has the priority to enter the zone. Priority may be determined in several ways. In some embodiments, aircraft that are already in the controlled zone have top priority, and other aircraft wait for them to exit before entering the controlled zone. In some embodiments, if two aircraft are approaching a controlled zone, the aircraft with the earliest ETA to the controlled zone will take priority. In some embodiments, if two aircraft are approaching a controlled zone, the aircraft with a lower assigned "serial number" will take priority. The serial number is an identification number that can be assigned to UAVs 102 prior to launch either by the distribution center 101, the global services 103, a manufacturer, or some other mechanism. In some embodiments, the priority of an aircraft requesting entry into the controlled zone can be decided by a transmission time associated with the earliest entry-request notification. In this embodiment, the aircraft with the earliest transmitted entry-request can be prioritized. Similarly, priority may also be given to an aircraft that has first transmitted a zone-entry notification.

Priority can also be determined based on mission related parameters of a UAV. For example, a UAV that is carrying a high priority medical payload for delivery, can be granted priority over other UAVs that are carrying less important payloads. Similarly, a UAV that is already in some critical phase of its mission (e.g. in the middle of an approach to a destination site 105 to deliver a payload) may take priority over a UAV that is not in a critical phase of its mission. Priority may also be given to an aircraft that has been waiting for a longest time to enter a controlled zone, or priority may be given to aircraft that are running low on fuel or battery capacity. Similarly, if the controlled zone in question is a landing site and/or a distribution center 101, priority may be given to a damaged aircraft that is in danger of crashing. Priority may also be given in such a way as to minimize the possibility of aircraft running into each other during their flight maneuvers. For instance, if the controlled zone is a landing site, priority may be given to aircraft that are at a lower altitude or closer to the site, over aircraft that are at a higher altitude or further away from the landing site. This form of prioritization tends to avoid the possibility of aircraft crossing the flight paths of other aircraft.

Each UAV 102 determines priority in the same way in order to prevent multiple aircraft having conflicting priorities. In a given circumstance, all local aircraft approaching a controlled zone should be able to agree on which among them has the highest priority, second priority, and so on. This agreement on priority may not happen if all the aircraft do not follow the air traffic management protocol, or if, for some reason, they have a different understanding about their circumstances (e.g. one aircraft is not aware of another aircraft for some reason).

For the sake of safety, an aircraft that has lost its ability to communicate, does not agree with its peers on priority, or which does not appear to follow the air traffic management protocol may be given the highest priority by other aircraft, in order to avoid or reduce the risk of a collision. This is done because a non-communicative or non-conformant aircraft may enter a controlled zone regardless of the priority that is decided by other aircraft according to the air traffic management protocol. Such an aircraft is operating in a non-conformant way, but may be given the right of way by all other aircraft to prevent a collision. An aircraft that violates the air traffic management protocol will be identified by other UAVs, and such other UAVs will report the violation of the protocol to the distribution center 101 and/or the global services 103. Non-conformant aircraft can be inspected when they return to a distribution center 101, and can be repaired or removed from service as necessary, to prevent future violations.

Returning to FIG. 2E, if a UAV 102 has priority over any other conflicting aircraft, it's mission planning module 200 will instruct its communications system 203 to transmit 292 a zone-entry notification and the UAV 102 will continue with the zone entry process, as described previously.

If a UAV 102 does not have priority over the other conflicting aircraft, then the mission planning module 200 of the UAV 102 will wait and retry 297. Waiting and retrying may involve several different actions. In one example, the mission planning module 200 will cause the UAV 102 to enter into a holding pattern until the higher priority aircraft have left the controlled zone. In another embodiment, the mission planning module 200 will cause the UAV 102 to slow its approach to the controlled zone, so that it can try to enter the zone after the higher priority aircraft have left. After the waiting period, the mission planning module 200 will cause the UAV 102 to again transmit 290 an entry-request notification, and restart the process of attempting to enter the controlled zone. In some embodiments, the waiting period is a fixed period of time that is defined by the air traffic management protocol. In another embodiment the waiting period is defined based on the number of aircraft in the vicinity of a controlled zone. Other methods of determining a waiting period can also be used. For example, the waiting period can be determined based on the characteristics of a controlled zone. Controlled zones where aircraft only spend a short period of time (such as corridor intersections) may have a short waiting period, while controlled zones where aircraft spend a longer period of time (such as delivery spots) may have a longer waiting period.

The air traffic management protocol may specify rules that require a UAV 102 to loiter or hold position in several circumstances. UAVs may be told to loiter if they are approaching a controlled zone and their ETA to the zone is expected to overlap with a time period when another aircraft is expected to be in the zone. A UAV may also be asked to loiter if it is flying in a flight corridor and the distance between it and other aircraft decreases below some safety margin distance. The requirement to loiter may not be absolute. In some circumstances the air traffic management protocol may allow aircraft to slow down or speed up as they travel within a flight corridor to increase or decrease their ETA to a zone, or to increase or decrease the spacing between aircraft flying within a flight corridor.

There is a possibility that a UAV that has followed the air traffic management protocol correctly, and has entered the controlled zone, may nevertheless find that another aircraft is already flying within the controlled zone. In this circumstance the mission planning module 200 will use the communications system 203 to transmit an emergency notification to the other remote aircraft. If the remote aircraft responds to the emergency notification, the mission planning module 200 will attempt to determine the priority between the UAV and the remote aircraft. If both aircraft can agree on which aircraft has priority, the aircraft with the highest priority will stay in the controlled zone, while the other aircraft will leave the controlled zone and only re-enter after the other aircraft has left. If mission planning module 200 cannot determine whether the other aircraft has acknowledged its priority (because it does not respond to communication, or because it determines a priority that disagrees with the mission planning module's determination) then the mission planning module 200 will cause the UAV 102 to exit the controlled zone.

Although the UAV 102 is designed to operate autonomously, the mission planning module 200 is configured to receive instructions via the communications system 203 that may override the mission planning module 200's flight plans. For example, the UAV 102 may receive instructions from a distribution center 101 or the global services 103 that command the UAV 102 to return to base immediately due to bad weather or a passenger aircraft entering the area. On receiving such a command the mission planning module 200 will change the movement goals of the UAV 102 and issue new directives to the other modules, so that the UAV 102 adjusts its flight path as necessary. The UAV 102 may continue to apply the air traffic management protocol to its flight along the adjusted route.

The structure and functionality of the UAV 102 described above has been divided into modules based on one example implementation, but the functionality of various modules may be merged or further split such that there are more or less components than have been illustrated in FIG. 2A. It is also possible to devolve some of the functionality of the various modules directly into the actuators, sensors, and other hardware components of the UAV 102. For instance, the flight control module 201 may communicate directly with a plurality of actuator motors, each of which has the functionality of the described actuator control system 204. Such a decentralization of hardware component control may be beneficial in some implementations from the point of view of fault-tolerance.

Distribution Center

The distribution center 101 handles the local logistics for the UAS 100. When the global services 103 receive a service request from a service requestor 104, the global services 103 will select a distribution center 101 to fulfill the service request according to criteria in the service request, including the location of the destination site 105. The global services 103 will then send at least a portion of the information in the service request to the selected distribution center 101.

The distribution center 101 is responsible for launching and recovering UAVs 102, maintaining and monitoring inventories of payloads, equipment, batteries, and UAVs 102, and communicating local information to the global services 103. Other functions such as UAV, battery, and payload selection for missions, mission data preparation, UAV monitoring and communication during the mission, and other tasks can be performed by either the distribution centers 101 or the global services 103, depending on implementation and/or system status. A distribution center operator 107 may be stationed at the distribution center 101 to facilitate the distribution center operations.

Figure 3:
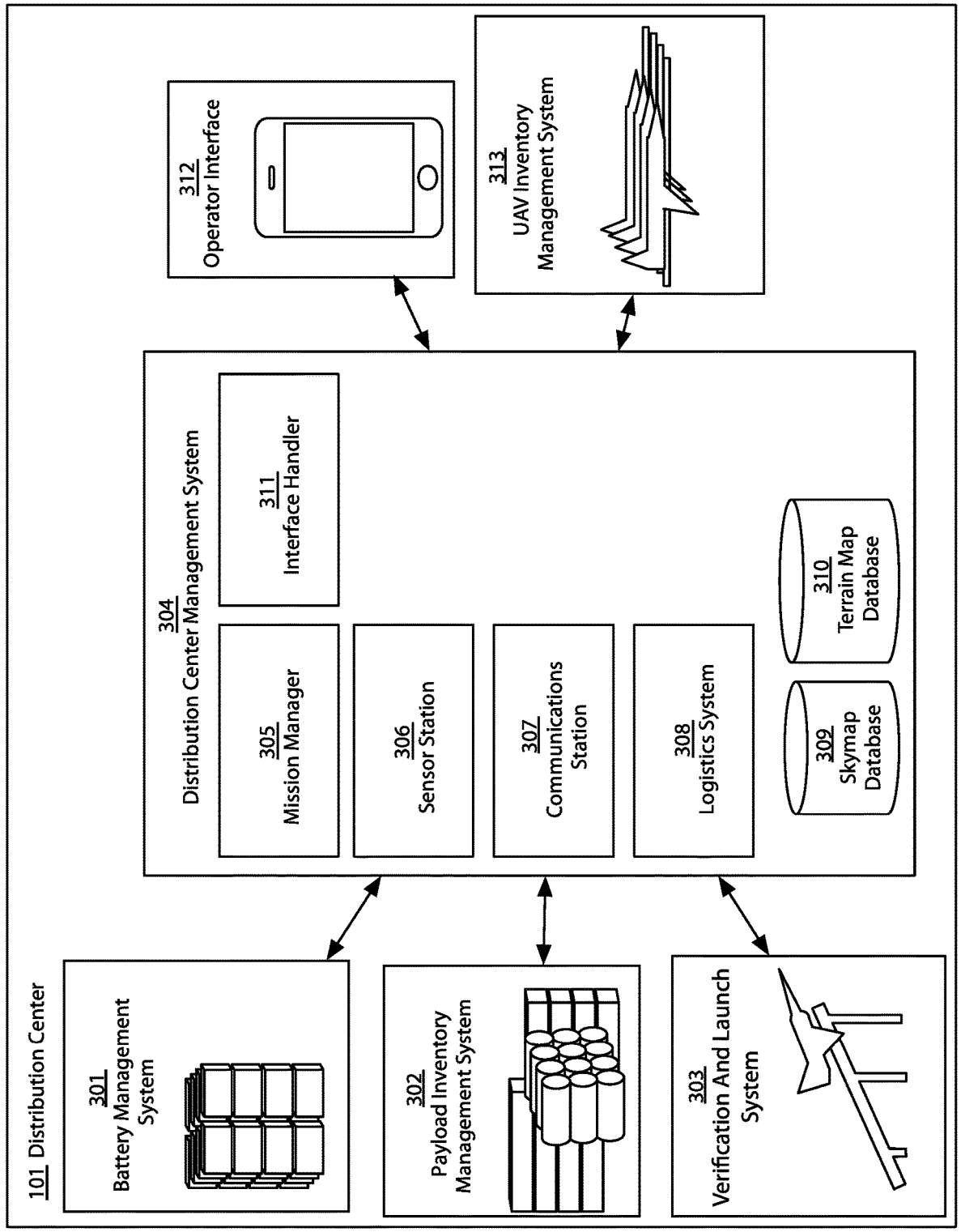
FIG. 3 is a diagram illustrating the components of a distribution center, according to one example embodiment.

FIG. 3 is a block diagram of a distribution center 101, according to one example embodiment. As mentioned previously, some of the functions performed by this embodiment of the distribution center 101 could be performed by the global services 103 instead. Similarly, some of the functions of the global services 103 could be performed locally by the distribution center 101. System designers with skill in the art may divide the functionality of the global services 103 and the distribution centers 101 in any appropriate way based on the requirements of a particular UAS implementation.

In this embodiment, the distribution center 101 is comprised of a battery management system 301, a payload inventory management system 302, a verification and launch system 303, a distribution center management system 304, an operator interface 312, and a UAV inventory management system 313.

The distribution center management system 304 serves as the hub of the distribution center 101. In this embodiment, the distribution center management system 304 comprises a mission manager 305, sensor station 306, communications station 307, logistics system 308, skymap database 309, terrain map database 310, and interface handler 311. In one example embodiment, the distribution center management system 304 is implemented using one or more computer servers that have specialized sensor and communications peripherals installed.

Some of the functions of the distribution center 101 may require the assistance of a human distribution center operator 107. For example, UAV assembly, UAV repair, payload attachment and detachment, UAV recovery, battery replacement, placing UAVs 102 on the verification and launch system 303, and placing batteries into charging equipment are tasks that may require human involvement if they are not fully automated. The operator interface 312 allows the distribution center operator 107 to receive information and instructions from the distribution center management system 304 and the global services 103, as well as to send information and instructions back to the distribution center management system 304 and the global services 103. The distribution center management system 304 communicates with the operator interface 312 via the interface handler 311. In some embodiments, the operator interface 312 is an application running on a smartphone, a tablet computer, or a personal computer, and the interface handler 311 communicates with the application via a wireless communications protocol, such as IEEE 802.11.

The mission manager 305 is a module that is responsible for managing the local aspects of mission operations at the distribution center 101. In some embodiments, the mission manager 305 receives service requests (or data derived from the service requests) from the global services 103, selects a UAV 102 or UAV components that will be assembled into a UAV 102, prepares the mission data that will be utilized by the UAV 102 during the mission, selects an appropriate payload for the mission, tests and launches the UAV 102, and monitors the status of the UAV 102 and payload during the mission. The mission manager 305 communicates with the distribution center operator 107 via the operator interface 312 during various stages of the mission to communicate both the status of the mission, as well as instructions indicating the actions to be taken to facilitate the preparation, loading, launch, and recovery of UAVs 102.

The mission manager 305 utilizes the other components of the distribution center management system 304 to monitor the status of the local environment and various local components of the UAS 100, including the UAVs 102, verification and launch system 303, battery management system 301, and the local inventories.

The mission manager 305 maintains contact with the global services 103 and local UAVs 102 through the communications station 307. Information about service requests is received from the global services 103, and information about local conditions, ongoing missions, inventories, etc., is transmitted back to the global services 103. The communications station 307 may have transmitters and receivers for several different standard telecommunications protocols, including, but not limited to GSM, CDMA, GSM, 3G/4G, LTE, etc. In addition to these standard protocols, the communications station 307 may also support direct-link, line-of-sight or mesh protocols to enable direct communications with UAVs 102 and other distribution centers 101. Finally, the communications station 307 may also include a wired connection to the Internet for high-speed communication with the other components of the UAS 100 and third-party information providers. The mission manager 305 may send some of the information received via the communications station 307 to the operator interface 312, so that the distribution center operator 107 can monitor the status of UAVs 102 or other components of the UAS 100 that are relevant to a local mission.

The sensor station 306 is primarily used to gather local weather data for the distribution center 101's location. The sensor station 306 may include pressure sensors, thermometers, wind sensors, precipitation detectors, etc. The sensor station 306 may also be used to detect and track UAVs 102 using instruments such as radars, radio trackers, and optical object recognition systems. The mission manager 305 may present information from the sensor station 306 to the distribution center operator 107 via the operator interface 312, so that the distribution center operator 107 can take actions necessary to protect the UAVs 102 and distribution center 101 from inclement weather. For example, if the sensor station 306 detects an approaching storm, the mission manager 305 may display a notification to the distribution center operator 107 via the operator interface 312, and the operator 107 can follow procedures to recover UAVs 102 that have already been launched, to abort missions that have not been launched, and the like.

Prior to any vehicle mission being launched, the mission manager 305 determines the mission energy requirement for the mission based on mission information. Mission information may include information from the service request, information about the local conditions (such as temperature, wind, and precipitation), and information about the characteristics of the vehicle and payload. For example, in one embodiment, the energy requirement is determined by computer analysis of factors such as the location of the destination site 105, the route to the destination site 105, the wind conditions along the route to the destination site 105, the flight characteristics of the UAV 102 that will handle the mission (such as its typical power consumption per unit distance flown, aerodynamic drag, etc.), and the weight of the payload that is needed to fulfill the service request. The mission manager 305 communicates the mission energy requirement to the battery management system 301, which then selects one or more batteries that can provide sufficient power for the mission, from the battery inventory. The battery management system 301 may automatically install the selected batteries into the UAV 102 that will fly the mission, or it may use indicators to notify the distribution center operator 107 that specific batteries must be installed. Further details related to the operation of the battery management system 301 are discussed below.

The logistics system 308 tracks the inventory levels of various components at the distribution center 101, and reports these inventory levels to the global services 103 and the mission manager 305. This inventory information may be used when selecting a particular distribution center 101 to fulfill a service request.

The logistics system 308 interfaces with the battery management system 301, the payload inventory management system 302, and the UAV inventory management system 313 to determine the inventory levels of batteries, payloads, and UAVs/UAV components, respectively. The logistics system 308 is capable of requesting deliveries of additional stock when inventory levels fall below a threshold level or when inventory levels are predicted to fall below a threshold level within a specified period of time.

The global services 103 may monitor the inventory levels reported by the logistics system 308 and may proactively dispatch additional inventory items to a distribution center 101 based on current inventory levels or the predicted inventory levels in the future. The logistics system 308 may also directly notify the distribution center operator 107 of inventory shortages, or of errors with specific items in an inventory, via the operator interface 312. Based on these notifications, the distribution center operator 107 may restock or repair items as needed.

Each item at the distribution center 101 may be affixed with a tracking tag that can be monitored by the logistics system 308. Various technologies can be used to implement the tracking tags, including bar codes, RFID tags, NFC tags, etc. These tags may be affixed to every item at the distribution center 101 that requires tracking, including UAVs 102, UAV components, payloads, batteries, spare parts, etc. The tags associate an object identifier with each tracked physical object at the distribution center 101. For example, each payload at the distribution center 101 will have an object identifier associated with it that is indicated by the tag affixed to it. The object identifier may be read from the tag by way of a reader that is configured to scan the tag. For example, an RFID tag would be read using an RFID reader, an NFC tag using an NFC reader, etc.

The object identifiers can be used to determine the type of an object that has been scanned as well as its unique identity. For example, the tag affixed to a payload object will identify that the object is a payload of a specific type, as well as that it is a specific instance of that payload, different from other payloads of the same type in the inventory. In some embodiments, the object identifier can be used to determine a database entry associated with the object in an inventory database. The logistics system 308 reports the inventory levels for objects associated with each object identifier to the global services 103.

The illustrated embodiment of a distribution center 101 also includes a payload inventory management system 302 that tracks inventory levels and status for various payloads that may be mounted to the UAVs 102. The payload inventory management system 302 may also provide recharging, refrigeration, and other maintenance related functions related to specific payloads. For instance, if the payload is a vaccine, then the payload inventory management system may provide a refrigerated storage container for vaccine doses and may monitor and report the temperature in the storage container and the number of doses stored in the container to the logistics system 308. The mission manager 305 may notify the distribution center operator 107 of the status of various payloads stored at the distribution center 101 via the operator interface 312. For example, in some embodiments, the mission manager 305 may send a notification to the operator interface 312 to notify the distribution center operator 107 that a particular vaccine stored in the payload inventory management system 302 has expired. Based on this notification the distribution center operator 107 may remove the expired vaccine from storage and replace it with new stock.

The UAV inventory management system 313 tracks the assembled UAVs 102 and UAV components stored at the distribution center 101, and reports this information to the logistics system 308. The mission manager 305 or global services 103 may query the logistics system 308 to determine the UAV resources available for missions at a particular distribution center 101, and may allocate these resources based on the requirements of service requests received by the UAS 100. When a particular UAV configuration is required to fulfill a mission, the mission manager 305 may send instructions to the distribution center operator 107, via the operator interface 312, to assemble a particular set of UAV components—stored in the UAV inventory management system 313—to construct a UAV suitable to complete that mission. As UAVs or UAV components are added and removed from the inventory, the UAV inventory management system 313 tracks not only the availability of these resources, but also the status of components, such as their condition and need for replacement. This information may be used by the mission manager 305 and the global services 103 to order deliveries of new UAVs 102 or components for the distribution center 101.

The mission data that will be uploaded to the UAV 102 is prepared based on the requirements of the service request received from the global services 103. Although we discuss the preparation of the mission data by the mission manager 305, alternative embodiments are possible, where either the global services 103 or the mission planning module 200 onboard the UAV 102, prepare the mission data. The mission data includes not only the location of the destination site 105 and the payload required to satisfy the service request, but also information required to generate a flight route to the destination location. The information required for route generation is stored locally in the skymap database 309 and the terrain map database 310.

The skymap database 309 contains data about a plurality of flight corridors in the geographic region served by the distribution center 101. The skymap database 309 may be at least partially synchronized with a global skymap database 400 that is part of the global services 103. The flight corridor data includes information about the real-time conditions within the flight corridors, such as weather, air traffic, etc. The local skymap database 309 updates the flight corridor data based on the latest information received from the global services 103, other distribution centers 101, and third parties (such as weather services and air traffic controllers). UAVs 102 that have recently flown in a flight corridor may also send data to the distribution center 101 about the last monitored conditions present in the flight corridor, and this information may be used by the skymap database 309 to update the relevant flight corridor data. When the local skymap database 309 at the distribution center 101 has more recent information about a flight corridor than the global skymap database 400, the global skymap database 400 is updated via the communications station 307. The reverse is also true, and the latest updates from the global skymap database 400 are received via the communications station 307 and incorporated into the local skymap database 309.

The terrain map database 310 contains terrain data, which is information about the terrain and ground obstacles in the geographic region served by the distribution center 101. This terrain data can be stored in a number of ways, including but not limited to, as raw images, as a heightmap, and as a three-dimensional (3D) mesh. The global services 103 also include a global terrain map database 401, which is at least partially synchronized with the local terrain map database 310. As in the case with the skymap databases, the terrain map database 310 is updated based on data captured from UAVs 102 during their mission flights. For example, if a UAV 102 flies over a location and captures information regarding a new obstacle that was not present at that location in the terrain map database 310, the terrain map database 310 will be updated with the new information via data received from the UAV 102, either during the mission, or after the UAV 102 has been returned to the distribution center 101.

Although the information about the flight corridors from the skymap database 309 may be sufficient to route the UAV 102 to the destination site 105, information about the ground that the UAV 102 is flying over can also be useful during various phases of the mission. For instance, during UAV launch and recovery, the terrain and obstacles near the launch and recovery sites are relevant. In addition, if the service request requires a package delivery, then the terrain and obstacles at the destination site 105 are relevant, as the UAV 102's mission planning module 200 must determine a location from which to drop the payload such that the payload lands in an accessible place and does not damage local structures, objects, or persons.

The information from the terrain map database 310 is also useful for fulfilling service requests that require surveillance or mapping. In some instances, the terrain data from the terrain map database 310 can be used to fulfill a surveillance or mapping request without launching a UAV. For example, if a UAV 102 has recently captured imagery at a destination site 105 at a particular location, and a subsequent service request asks for image capture at the same location, within some threshold time limit, then the most recent information from the destination site 105 that has been stored in the terrain map database 310 can be sent to the service requestor 104.

To prepare the mission data locally, the mission manager 305 first determines the location of the destination site 105 from the service request information received from the global services 103. Based on this destination location, and the launch location, which is typically the location of the distribution center 101, the mission manager 305 determines the relevant area of operations for the mission, and extracts the data associated with this geographic region from the skymap database 309 and the terrain map database 310. The extracted information is sent to the UAV 102 as part of the mission data. In some embodiments, the mission manager 305 also provides the UAV 102 with a lowest cost route to the destination site 105 as part of the mission data. Depending on the implementation, the route can be dynamically updated by the global services 103, the mission planning module 200 in the UAV 102, and/or the mission manager 305. When the connectivity to the UAV 102 cannot be guaranteed during the mission flight, the mission planning module 200 onboard the UAV 102 may be allowed to dynamically update the route. The process for dynamic route generation is explained in more detail in the description for FIG. 2B. In embodiments discussed in connection with FIG. 2B, the UAV 102 receives the skymap data and determines the lowest cost route to the destination site 105 using the onboard mission planning module 200, instead of receiving the route from the mission manager 305.

In some embodiments, the UAV 102 stores complete mirrors of the skymap database 309 and the terrain map database 310, instead of only subsets of the information in these databases. This can be done when the size of the databases is small enough that the storage resources on the UAV 102 are sufficient to store the entire dataset. When this is not the case, a subset of the information may be stored in the UAV 102, as described earlier. Similarly, in the case where the local skymap database 309 and local terrain map database 310 have sufficient storage capacity, the entire global skymap 400 and global terrain map 401 may be stored locally at the distribution center 101. Subsets of the global data may be extracted and stored locally only when the global data sets are too large for complete local mirroring to be economical.

The verification and launch system 303 is responsible for testing, verification, and launching of UAVs 102. The UAVs 102 are loaded into the verification and launch system 303, and their components are tested to ensure that they will perform during the mission. Any faulty components are identified at this stage and brought to the attention of the distribution center operator 107 via the operator interface 312. The verification and launch system 303 also verifies, via the affixed tags, that each component in the assembled UAV 102 is a component allocated by the mission manager 305 for the current mission. For example, the verification and launch system 303 detects the battery and engines attached to the UAV 102, and ensures that they have adequate charge and performance for the mission, prior to launch. Any discrepancies are brought to the attention of the distribution center operator 107 for correction. Similarly, the verification and launch system 303 verifies that the payload loaded onto the UAV 102 is the right payload for the current mission.

The verification and launch system 303 is designed to allow the distribution center operator 107 to launch multiple aircraft, in high-volume, reliably and repeatedly, within a short period of time. More details regarding the verification and launch system 303 are provided in connection with the description for FIGS. 5A through 5K.

Once the verification and launch system 303 verifies the UAV 102, the UAV 102 is launched, and the mission manager 305 continues to monitor the aircraft during the mission flight. The mission manager 305 receives status updates from the UAV 102, and these status updates enable the mission manager 305 to track the progress of the mission at least intermittently. The mission manager 305 may present information related to the UAV 102's status to the distribution center operator 107 via the operator interface 312. In the event that there is some local event that requires a mission termination, such as, for example, an approaching storm, either the mission manager 305 or the distribution center operator 107 (or both), via the operator interface 312, can send a command to the UAV 102, through the communications station 307, to instruct the UAV 102 to return to the distribution center 101.

Global Services

The global services 103 are a collection of software services running on one or more computer servers, accessible through the Internet or another communications protocol. In one example embodiment, the global services 103 are software modules running on virtual machines in a third-party data center, such as Amazon Web Services or Google Cloud.

One purpose of the global services 103 is to provide a global infrastructure to coordinate, support, and manage multiple distribution centers 101, service requestors 104, and UAVs 102. However, in some embodiments, it is conceivable that the functionality of the global services 103 is provided by a local computer server, and that the server serves a local set of UAVs 102, distribution centers 101, and service requestors 104—possibly only a single one of each.

One or more global system operators 106 and remote vehicle operators 108 connect to the global services 103 and provide human intervention for systems that cannot be fully automated (or require temporary human assistance). The global system operators 106 and remote vehicle operators 108 typically connect to the global services 103 through control devices. A control device may be a computer workstation, a personal computer, a tablet device, a smartphone, or any other computing device that can communicate through a network with the global services 103. For instance, in one example embodiment, a global system operator 106 uses a laptop computer, with an Internet connection, to connect to the global services 103 executing on a computer server, which is also connected to the Internet.

Figure 4:
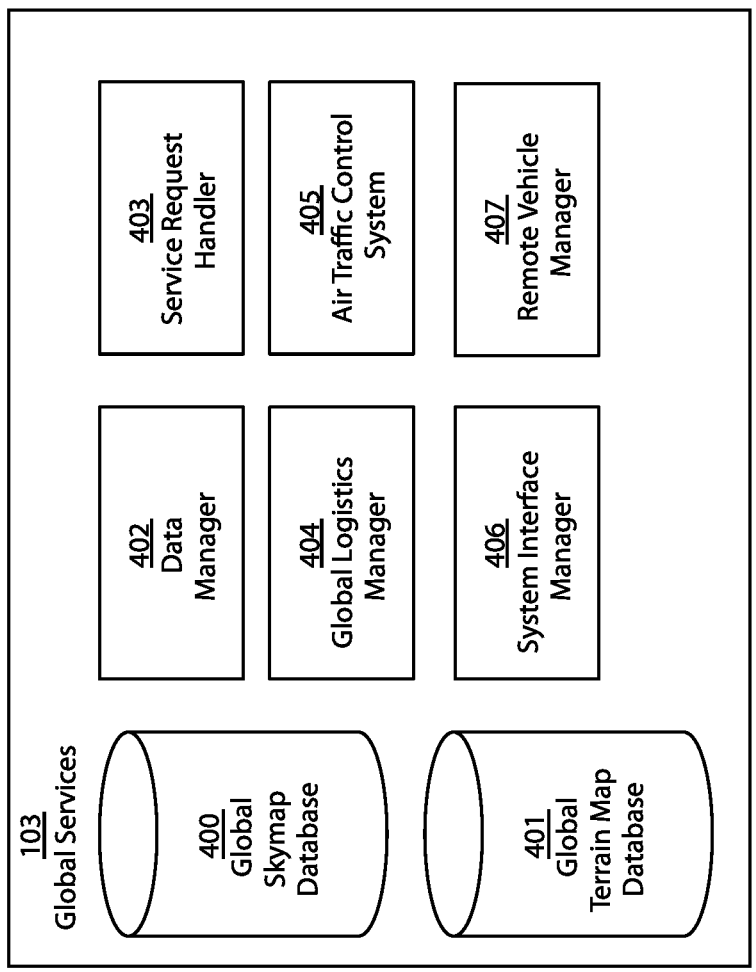
FIG. 4 is a diagram illustrating the components of the global services, according to one example embodiment.

In the example embodiment illustrated in FIG. 4, the global services 103 are configured to serve a plurality of distribution centers 101, UAVs 102, and service requestors 104. In this embodiment, the global services 103 comprise a global skymap database 400, a global terrain map database 401, a data manager 402, a service request handler 403, a global logistics manager 404, an air traffic control system 405, a system interface manager 406, and a remote vehicle manager 407.

As discussed earlier, the global skymap database 400 and the global terrain map database 401 are global repositories for skymap and terrain map data in the UAS 100. As was the case with the local versions of these databases, the information in these databases can be represented in various ways depending on the needs of the UAS 100. Although these databases are represented as single units in the illustrated embodiment, in practice the databases may be implemented using several mirrored data stores to provide improved read speed, redundancy, and error recovery.

The data manager 402 manages data-writes into, and data-reads out of the global databases. For example, as updates to the local skymap databases 309 and local terrain map databases 310 are communicated to the global services 103, the data manager 402 ensures that the information is stored in the appropriate database and that the latest information is always available and is not overwritten by out-of-date information. The data manager 402 also manages information received from outside of the UAS 100 and integrates this information into the global databases. For instance, information received from third-party weather information providers, aviation authorities, and external air traffic controllers may be integrated into the global skymap database 400. Similarly, third-party topographical data, map imagery, and surveillance data may be integrated into the global terrain map database.

The data manager 402 also manages the updates sent to the local databases at each distribution center 101. In one embodiment, as the global skymap database 400 and global terrain map database 401 are updated, the data manager 402 will monitor the regions where those updates are relevant, and will send at least a portion of those updates to distribution centers 101 that are in the relevant regions. In another embodiment, the mission manager 305 at a distribution center 101 in a particular region will periodically request information about that region from the global services 103, and the data manager 402 will determine the set of information that is relevant to that region from the global databases, and will send that information to the distribution center 101, where the information may be integrated into the local databases. Similarly, a UAV 102 in flight may request information about its current location from the global services 103, and the data manager 402 may similarly determine the relevant information that should be sent back to the UAV 102 based on the UAV 102's location.

The service request handler 403 manages service requests sent by service requestors 104 that are received by the global services 103. When a service request is received by the global services 103, the service request handler 403 will communicate with the global logistics manager 404 to determine a distribution center 101 that is suitable for handling the service request locally. As mentioned previously, the selection of the distribution center 101 may take into account not only the location of a destination site 105 specified in the service request, but also the logistic requirements of the request, such as payload, UAV capability, etc. For instance, a service request may include information that specifies a payload type required to complete the request, and the distribution center 101 may be selected based on the availability of that payload type at various distribution centers 101.

The payload type may be specified directly by means of a payload identifier associated with a type of payload, or it may be specified by implication. For example, a camera payload may be specified by implication if the service request is a request for image data at the destination site 105.

In some embodiments, the service request handler 403 takes input from a global system operator 106 to determine the distribution center 101 that will be used to fulfill a service request.

Once the distribution center 101 and UAV 102 have been identified and reserved to fulfill a service request, the service request handler 403 may notify the service requestor 104 that the service request is in process. The service request handler 403 may also receive information from the distribution center 101 and/or the UAV 102 that allows a predicted time of mission completion to be estimated and sent to the service requestor 104.

The service request handler 403 is capable of communicating with the service requestor 104 via the system interface manager 406. A human service requestor 104 will typically send a service request to the global services 103 by means of some remote client device such as a mobile phone, a tablet, or a personal computer. The system interface manager 406 is capable of sending information to the client device operated by the service requestor 104 that is configured to be displayed on the client device. For example, in one embodiment, the system interface manager 406 functions as a web server, and the client device connects to the web server and displays a web page that is downloaded from the system interface manager 406. In this example, the service requestor 104 can receive and send information to the global services 103 via the displayed web page. In another embodiment, the system interface manager 406 exposes an application interface over the Internet (such as a representational state transfer, or "REST" interface), and an application running on the client device is configured to display information received from the global services 103 to the service requestor 104, and to send information inputted by the service requestor 104 back to the global services 103.

The service request handler 403 may also play an active part in determining the route a UAV 102 takes on a mission to complete a service request. For example, the service request handler 403 may use the system interface manager 406 to query a service requestor 104 for the precise location of the destination site 105, and the information provided by the service requestor 104 may be used to refine the flight route used by the UAV 102 in fulfilling the service request.

The structure and functionality of the global services 103, described above, has been divided into modules based on one example implementation, but the functionality of various modules may be merged or further split such that there are more or fewer components than have been illustrated in FIG. 4. For example, it is possible to merge the skymap and terrain map databases into a single data store. Some of the services illustrated can be moved outside the UAS 100, for example, the air traffic control system 405 and the global logistics manager 404 may be operated outside the UAS 100 as independent services, accessible through an Application Programming Interface (API). These and other changes to the structure do not change the overall architecture of the system, and systems with such changes may operate in the same or similar manner as the system disclosed.

The service request handler 403 utilizes the global logistics manager 404 to obtain information required for distribution center 101 and UAV 102 selection. The global logistics manager 404 tracks the inventory information in each local logistics system 308 at each distribution center 101. The global logistics manager 404 may proactively route additional stock to local distribution centers 101 when supplies of any inventory item are depleted, are below some threshold quantity, or are predicted to be depleted within some threshold time. The global logistics manager 404 may also notify a global system operator 106 in the event of an inventory shortage at a distribution center 101. The global system operator 106 may take actions outside the UAS 100 to route new inventory items to the distribution center 101, such as, for example, ordering and shipping items from a third-party warehouse.

In one embodiment, the global logistics manager 404 relocates UAVs 102 from a first distribution center 101 that has an excess of UAVs to a second distribution center 101 that has a shortage of UAVs. In this embodiment, the global logistics manager 404 may monitor the daily, monthly, or yearly patterns of service requests to determine the estimated UAV requirements at each distribution center 101 over a period of time. Based on these estimated UAV requirements, the global logistics manager 404 may preemptively relocate UAVs from one distribution center 101 to another. The relocation of UAVs 102 may be done using third-party shippers, or the relocation may be done by sending requests to the distribution centers 101 to launch UAVs 102 with destination sites 105 set to other distribution centers 101. As an optimization, these relocation flights may be scheduled during times when the service request volume is low, for example, late at night or during holidays.

The air traffic control system 405 is responsible for tracking the UAVs 102 and aircraft that are known to be in flight in the area served by the UAS 100. The air traffic control system 405 receives information from the distribution centers 101, the UAVs 102 in flight, and from third party air traffic information providers. The information received by the air traffic control system 405 includes the known positions of aircraft in the area of the UAS 100, as well as flight routes that are registered with the system. Distribution centers 101 and/or UAVs 102 may register flight routes for missions, with the air traffic control system 405. The air traffic control system 405 may also allow UAVs and aircraft operated by third parties to register their flight routes.

The air traffic control system 405 provides real-time information updates regarding the positions of aircraft and UAVs to UAVs 102 that are flying missions. Using this information, the mission planning modules 200 onboard the UAVs 102 may modify their flight routes to avoid colliding with other aircraft. The air traffic control system 405 may offer similar information updates to UAVs and other aircraft that are operating outside the UAS 100 in order to maintain a safer airspace for all aircraft operations.

The air traffic control system 405 also provides information to the service request handler 403 and the global logistics manager 404. Information from the air traffic control system 405 may be used to influence the selection of distribution centers 101 for service requests and the relocation of UAVs 102. For example, a service request may be routed away from distribution centers 101 where there is an excess of air traffic in the vicinity, and UAV relocation may be timed to avoid periods when air traffic is at its highest.

The remote vehicle manager 407 provides autonomous vehicles, such as the UAVs 102, with a human operator on demand. In the course of a mission, a UAV 102 may encounter a situation that its mission planning module 200 or flight control module 201 cannot understand or safely handle. For example, an autonomous vehicle in an urban environment may not have the necessary routing and vision systems to handle path-determination and object avoidance in such a complex setting. Thus, an autonomous vehicle, such as a UAV 102, may fly under the control of its onboard mission planning module 200 and flight control module 201 while in a relatively simple and uncluttered environment outside a city, but may then request human assistance once a city is entered.

We claim:

1. A method of controlling a first unmanned aerial vehicle, comprising:
   determining a first estimated time of arrival of the first unmanned aerial vehicle to a geographical area defined by a volume of airspace having fixed bounds;
   transmitting, over a mesh network, a first status message to a second unmanned aerial vehicle via an intermediate unmanned aerial vehicle, the first status message comprising the first estimated time of arrival, the first, second, and intermediate unmanned aerial vehicles corresponding to nodes of the mesh network;
   receiving, over the mesh network, a second status message from the second unmanned aerial vehicle via the intermediate unmanned aerial vehicle and/or a second intermediate unmanned aerial vehicle, the second intermediate unmanned aerial vehicle corresponding to a node of the mesh network, the second status message comprising a second estimated time of arrival of the second unmanned aerial vehicle to the geographical area;
   comparing the first estimated time of arrival to the second estimated time of arrival;
   modifying at least one of a speed or a heading of the first unmanned aerial vehicle based on the comparison between the first estimated time of arrival and the second estimated time of arrival.

2. The method of claim 1, wherein modifying the at least one of the speed and the heading comprises increasing the speed of the first unmanned aerial vehicle if:
   the first estimated time of arrival is earlier than the second estimated time of arrival; and
   a difference between the first estimated time of arrival and the second estimated time of arrival is less than a safety margin.

3. The method of claim 1, wherein modifying the at least one of the speed and the heading comprises slowing the first unmanned aerial vehicle by causing the first unmanned aerial vehicle to reduce thrust.

4. The method of claim 1, wherein:
computer memory onboard the first unmanned aerial vehicle stores representations of a plurality of flight corridors; and
determining the first estimated time of arrival comprises determining a distance, along one of the plurality of flight corridors, between an estimated current position of the first unmanned aerial vehicle and a bound of the geographical area.

5. The method of claim 1, wherein transmitting a first status message comprises transmitting the first status message to the second unmanned aerial vehicle.

6. The method of claim 5, wherein transmitting the first status message further comprises transmitting the first status message to a plurality of additional remote unmanned aerial vehicles.

7. A first unmanned aerial vehicle comprising:
a processor; and
a non-transitory computer-readable storage medium storing instructions that, when executed by the processor, cause the first unmanned aerial vehicle to:
determine a first estimated time of arrival of the first unmanned aerial vehicle to a geographical area defined by a volume of airspace having fixed bounds;
transmit, over a mesh network, a first status message to a second unmanned aerial vehicle via an intermediate unmanned aerial vehicle, the first status message comprising the first estimated time of arrival, the first, second, and intermediate unmanned aerial vehicles corresponding to nodes of the mesh network;
receive, over the mesh network, a second status message from the second unmanned aerial vehicle via the intermediate unmanned aerial vehicle and/or a second intermediate unmanned aerial vehicle, the second intermediate unmanned aerial vehicle corresponding to a node of the mesh network, the second status message comprising a second estimated time of arrival of the second unmanned aerial vehicle to the geographical area;
compare the first estimated time of arrival to the second estimated time of arrival; and
modify at least one of a speed or a heading of the first unmanned aerial vehicle based on the comparison between the first estimated time of arrival and the second estimated time of arrival.

8. The first unmanned aerial vehicle of claim 7, wherein the non-transitory computer-readable storage medium further stores instructions that, when executed by the processor, cause the first unmanned aerial vehicle to increase the speed of the first unmanned aerial vehicle if: the first estimated time of arrival is earlier than the second estimated time of arrival; and
a difference between the first estimated time of arrival and the second estimated time of arrival is less than a safety margin.

9. The first unmanned aerial vehicle of claim 7, wherein the non-transitory computer-readable storage medium further stores instructions that, when executed by the processor, cause the first unmanned aerial vehicle to reduce its speed by gaining altitude.

10. The first unmanned aerial vehicle of claim 7, the non-transitory computer-readable storage medium further stores:
representations of a plurality of flight corridors; and
instructions that, when executed by the processor, cause the first unmanned aerial vehicle to determine the first estimated time of arrival by determining a distance, along one of the plurality of flight corridors, between an estimated current position of the first unmanned aerial vehicle and the geographical area.

11. The first unmanned aerial vehicle of claim 10, wherein the non-transitory computer-readable storage medium further stores instructions that, when executed by the processor, cause the first unmanned aerial vehicle to determine the first estimated time of arrival based at least in part on: a current wind speed at a point along the one of the plurality of flight corridors; and a heading of the first unmanned aerial vehicle.

12. A method of controlling a first unmanned aerial vehicle, comprising:
at the first unmanned aerial vehicle:
transmitting, over a mesh network, a first status message to a second unmanned aerial vehicle via an intermediate unmanned aerial vehicle, the first status message comprising a first estimated time of arrival of the first unmanned aerial vehicle to a geographical area defined by a volume of airspace having fixed bounds, the first, second, and intermediate unmanned aerial vehicles corresponding to nodes of the mesh network;
receiving, over a mesh network, a second status message from the second unmanned aerial vehicle via the intermediate unmanned aerial vehicle and/or a second intermediate unmanned aerial vehicle, the second intermediate unmanned aerial vehicle corresponding to a node of the mesh network, the second status message comprising a second estimated time of arrival of a second unmanned aerial vehicle to the geographical area;
determining whether a difference between the first estimated time of arrival and the second estimated time of arrival is less than a safety margin;
in accordance with a determination that the difference between the first estimated time of arrival and the second estimated time of arrival is less than the safety margin, determining whether the first estimated time of arrival is before or after the second estimated time of arrival; and
in accordance with a determination that the first estimated time of arrival is after the second estimated time of arrival, changing one or more flight parameters of the first unmanned aerial vehicle to increase the first estimated time of arrival.

13. The method of claim 12, further comprising, in accordance with a determination that the first estimated time of arrival is before the second estimated time of arrival, changing one or more flight parameters of the first unmanned aerial vehicle to decrease the first estimated time of arrival.

14. The method of claim 12, wherein the operation of changing one or more flight parameters of the first unmanned aerial vehicle to increase the first estimated time of arrival comprises decreasing a speed of the first unmanned aerial vehicle.

15. The method of claim 12, wherein the operation of changing one or more flight parameters of the first unmanned aerial vehicle to increase the first estimated time of arrival comprises increasing an altitude of the first unmanned aerial vehicle.

16. The method of claim 1, further comprising:
determining a priority between the first unmanned aerial vehicle and the second unmanned aerial vehicle to enter the geographical area, the priority including selecting between the first unmanned aerial vehicle and the second unmanned aerial vehicle by determining which unmanned aerial vehicle has a higher priority to enter the geographical area; and wherein modifying at least one of the speed or the heading of the first unmanned aerial vehicle is further based on the priority between the first unmanned aerial vehicle and the second unmanned aerial vehicle.

17. The first unmanned aerial vehicle of claim 7, wherein the instruction further cause the first unmanned aerial vehicle to modify at least one of the speed or the heading of the first unmanned aerial vehicle further based on a priority between the first unmanned aerial vehicle and the second unmanned aerial vehicle, the priority including selecting between the first unmanned aerial vehicle and the second unmanned aerial vehicle by determining which unmanned aerial vehicle has a higher priority to enter the geographical area.

18. The method of claim 12, further comprising, at the first unmanned aerial vehicle:

determining a priority between the first unmanned aerial vehicle and the second unmanned aerial vehicle, the priority including selecting between the first unmanned aerial vehicle and the second unmanned aerial vehicle by determining which unmanned aerial vehicle has a higher priority to enter the geographical area; and in accordance with the priority showing that the first unmanned aerial vehicle has priority over the second unmanned aerial vehicle, changing one or more flight parameters of the first unmanned aerial vehicle to decrease the first estimated time of arrival.

19. The method of claim 1, wherein the transmitting of the first status message comprises periodically broadcasting, over the mesh network, the first status message.

20. The method of claim 1, further comprising:

transmitting an entry-request notification indicating a planned entry of the first unmanned aerial vehicle into the geographical area; and causing the first unmanned aerial vehicle to enter the controlled zone, in response to the first unmanned aerial vehicle determining that a notification has not been received during a time period.

21. The method of claim 1, wherein comparing the first estimated time of arrival to the second estimated time of arrival further comprises, comparing the first estimated time of arrival to the second estimated time of arrival, locally, at the first UAV.

* * * * *